United States Patent [19]
Leclercq

[11] 3,815,085
[45] June 4, 1974

[54] CROSSROADS CONTROLLER

[75] Inventor: Ignace Leclercq, Massy, France

[73] Assignee: Societe de Fabrication d'Instruments de Mesure S.F.I.M., Massy, France

[22] Filed: Oct. 15, 1971

[21] Appl. No.: 189,713

[30] Foreign Application Priority Data
July 15, 1971 France.................... 71.25894

[52] U.S. Cl.............................................. 340/41 R
[51] Int. Cl............................................. G08g 1/085
[58] Field of Search.................... 340/35, 40, 41

[56] References Cited
UNITED STATES PATENTS

| | | | |
|---|---|---|---|
| 3,302,169 | 1/1967 | Wetmore .................... | 340/41 R |
| 3,434,115 | 3/1969 | Chomicki .................... | 340/41 R X |
| 3,500,308 | 3/1970 | Riddle et al. ................ | 340/35 |
| 3,500,455 | 3/1970 | Ross et al. .................. | 340/40 |
| 3,675,196 | 7/1972 | Molloy et al. ............... | 340/40 |

OTHER PUBLICATIONS
G–E SCR Manual, 4th edition, pages 138–139, Scientific Library TK2798. G4g.

*Primary Examiner*—William C. Cooper
*Attorney, Agent, or Firm*—Christie, Parker & Hale

[57] ABSTRACT

The apparatus controls the operation of a plurality of traffic signals. The apparatus includes a programmable basic assembly and at least one implementing assembly. Each implementing assembly selectively gates electricity to the lamps of a group of signals. The basic assembly exercises control over the operation of the implementing assemblies by providing to them in parallel a plurality of time-varying, binary-valued, digital control signals, each corresponding to a different display device. Preferably, one binary value orders a green-light condition and the opposite binary value orders a not green-light condition, and each implementing assembly includes timing means responsive to transitions between light-condition orders for sequentially actuating the lamps. The time-varying digital signals respectively define a plurality of repeating digital patterns or control waveforms. The control waveforms have a common duration (i.e., the time from when a pattern in one of the control waveforms begins to when it next begins to repeat is the same for all control waveforms) that is defined by a plurality of successively occurring sub-intervals or sequences. The basic assembly includes means for independently programming the durations of the successively occurring sequences and for independently controlling in parallel the binary values of the control waveforms. Preferably, the programming means includes means for identifying which sequence is in progress and a plurality of gating means each operative during the identification of a respective one of the sequences for independently controlling in parallel the binary values of the control waveforms.

15 Claims, 19 Drawing Figures

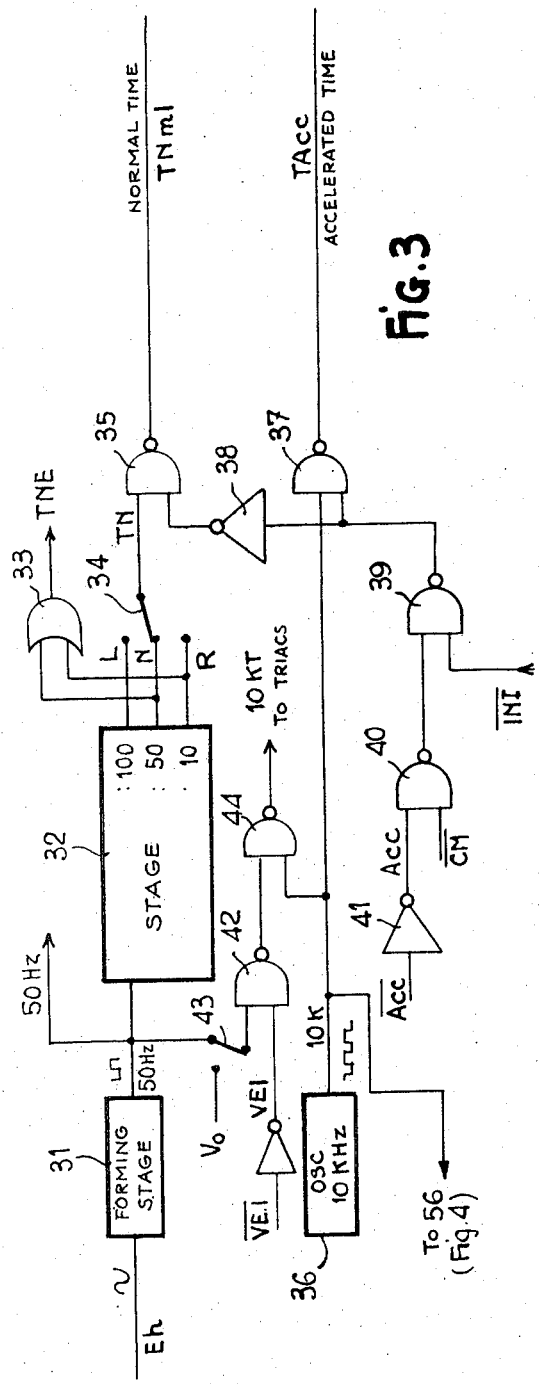
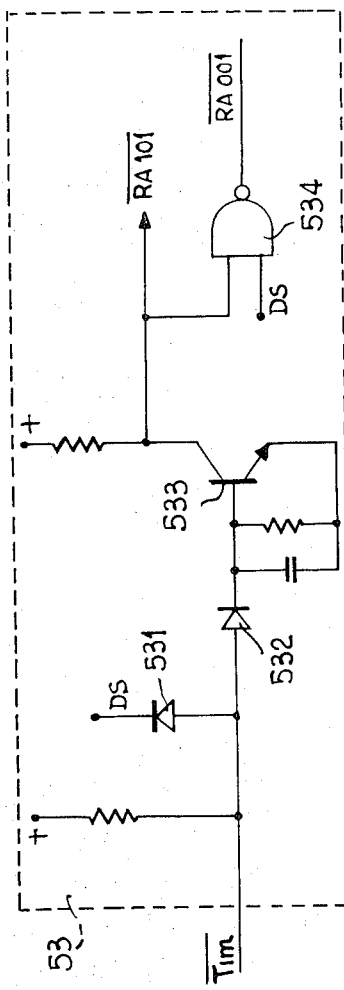
Fig. 3
Fig. 5

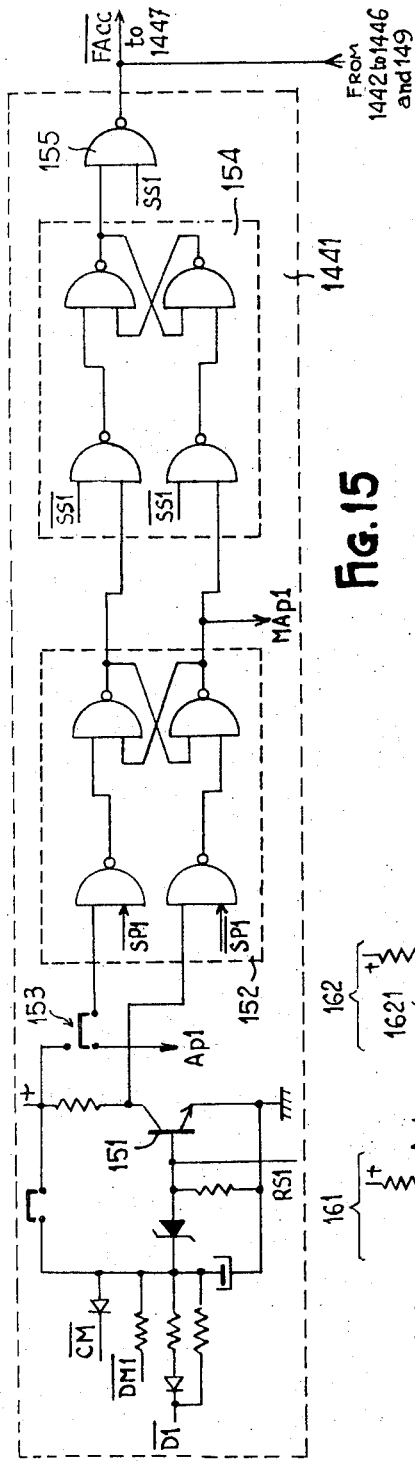
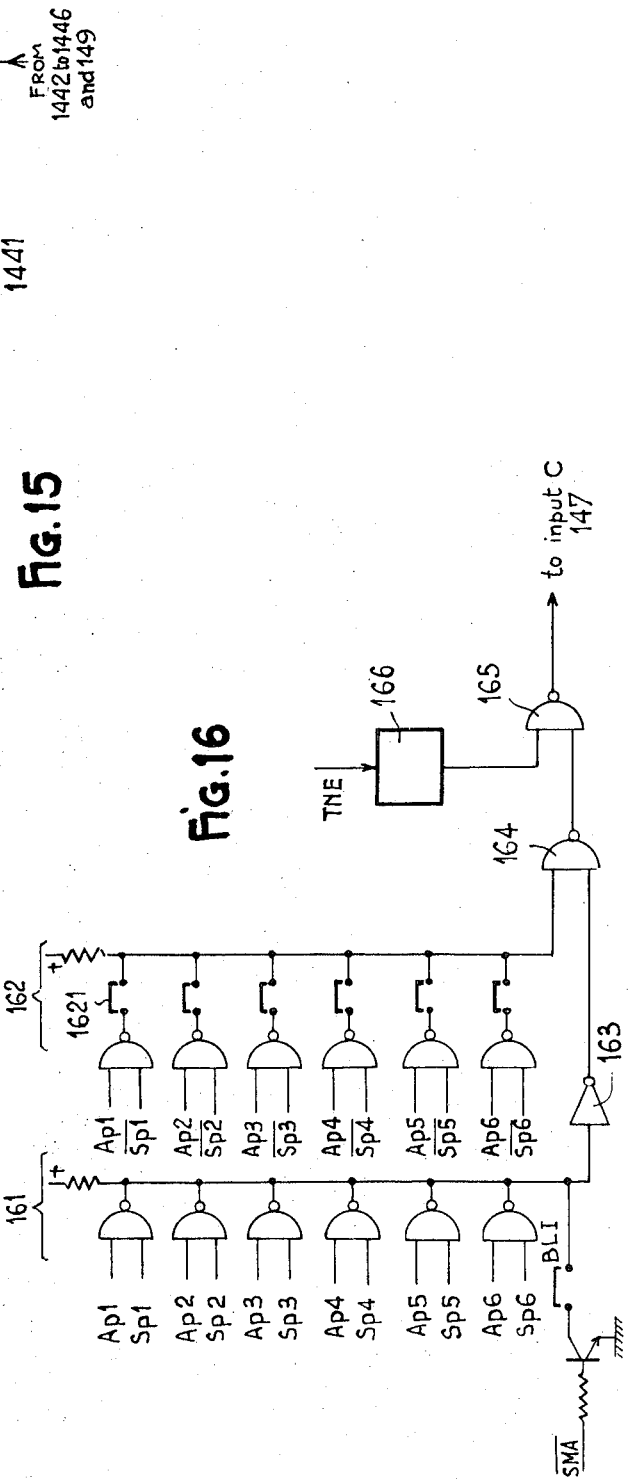
Fig. 15
Fig. 16

CROSSROADS CONTROLLER

The present invention relates to an apparatus of the so-called crossroads controller type, intended to ensure correct functioning of the three-colour traffic lights used at one or more adjacent crossroads.

Hereinafter in the present description, the term "crossroads" must be understood in the general sense of a number of traffic routes which intersect at the same point or at very nearby points.

The crossroads controller is therefore intended selectively to supply to a pluraltiy of groups of lights, generally, RED, AMBER and GREEN, respectively in each group, a supply of electricity for these lamps, emanating from the alternating current mains.

Hereinafter in this description, such a traffic signal display device will be more briefly referred to as a "traffic light", but it should be remembered that each traffic light includes a group of lamps.

The terms "control waveform" and "control cycle", used interchangeably hereinafter, have the same meaning, which will now be explained. Disclosed herein is a basic assembly (see F in FIG. 1) that provides in parallel a plurality of time-varying, binary-valued, digital signals, each corresponding to a different traffic light. Preferably, one binary value orders a GREEN-light condition and the opposite binary value orders a not-GREEN-light condition. The time-varying digital signals respectively define a plurality of repeating, serial digital patterns or control waveforms. The amount of time it takes for any one of the control waveforms to progress through a single one of its repeating patterns is the same as the amount of time it takes for any other one of the control waveforms. Accordingly, it is said that the control waveforms (or control cycles) have a common duration. Through these control waveforms, the basic assembly exercises control over at least one and preferably four implementing assemblies (see E1 in FIG. 1). Each implementing assembly selectively gates electricity to the lamps of a group of traffic lights. Although the implementing assemblies are subject to control by other influences (such as detector DE in FIG. 1), it will facilitate understanding of the basic concepts underlying this invention to consider, for the moment, that the implementing assemblies perform their gating function directly in accordance with the control waveforms. In other words, while a control waveform has a binary value ordering a GREEN-light condition, the implementing assembly gates electricity to the green lamp in the traffic light associated with that control waveform, and while the control waveform has a binary value ordering a not-GREEN-light condition, the implementing assembly blocks the flow of electricity to this green lamp. Also, the implementing assembly preferably includes sequencing circuitry for sequentially gating electricity to the amber lamp and the red lamp during the time that a not-GREEN-light order is received. It is desirable to course in regulating traffic flow to have some traffic lights have say their RED lamps lit while other lamps have say their GREEN lamps lit. Accordingly, the control waveforms for the different traffic lights differ from each other, and the term control waveform implies a distribution in time of RED, AMBER, and GREEN light conditions for the associated traffic light.

The term opposing roads shall be roads for which it is necessary that at most one of them have a GREEN or AMBER light, that is to say not a RED light.

It is clear that a crossroads controller cannot be manufactured individually for each particular traffic case under satisfactory conditions of economic efficiency.

Generally, therefore, it is desirable to manufacture crossroads controllers which permit of considerable flexibility of use under conditions of manufacturing cost which are not thereby prohibitive.

With regard to flexibility, it must be for example noted that the French regulations obtaining in matters of three-colour traffic lights, provide for a basic cycle of three colours, GREEN, AMBER and RED.

On the other hand, in other countries, the following cycles are used:
GREEN, GREEN and AMBER, RED
GREEN, AMBER, RED, RED and AMBER
GREEN, GREEN and AMBER, RED, RED and AMBER.

The main object of the present invention is a crossroads controller which is of relatively low prime cost while affording the flexibility which is desirable both from the point of view of the various possible crossroads which may be encountered and from the point of view of the various types of operating cycles which it controls, and the regulations which govern them.

Another object of the invention is a crossroads controller by means of which parallel or series functioning of two controllers may easily be implemented.

Another object of the invention is a crossroads controller in which the control cycles may be modified in response to numerous types of signals of external origin.

Another object of the invention is a crossroads controller capable of satisfying safety requirements, such as the need to establish a FLASHING AMBER when the aforesaid condition of opposing roads is not achieved.

Another object of the invention is a crossroads controller in which the illuminated condition of the RED lamp of the lights prevents the GREEN lamp of the same set of lights being simultaneously illuminated.

Another object of the invention is a crossroads controller in which the brightness of the lights may be modified in response to an external signal according to whether it is day or night.

Another object of the invention is a crossroads controller in which it is possible to implement a lights reservation function in particular situations.

In one distinguishing feature of this invention, a plurality of control waveforms formed in parallel are respectively associated with a plurality of traffic lights, there being a time interval which is common to the control waveforms, which time interval is defined by a plurality of sub-intervals or sequences with each sequence having a duration that is adjustable in accordance with a program. During each sequence, the parallel control waveforms provide programmatically selected light condition orders for the respective traffic lights.

According to the invention, the crossroads controller includes a sequence duration counter which is sequentially preset to a different one of a sequence of programmed initialization counts. Each initialization count corresponds to a different one of the sequences and is preset into the sequence duration counter before the start of its corresponding sequence. The sequence duration counter counts from whatever count to which it is preset until it reaches a predetermined count. The reaching of the predetermined count marks the end of one sequence and initiates the start of the following sequence. And, the time consumed in reaching this predetermined count varies in accordance with the programmed initialization count. Programming is accomplished by a programming matrix that allows for independently programming as to duration the respective sequences timed out by the sequence duration counter and that also provides for independently programming as to light condition orders the forming of the parallel control waveforms.

Further characteristic features and advantages of the invention will become manifest from the ensuing description which relates to non-limitative embodiments of the invention shown in the attached drawings, in which:

FIG. 3 is a detailed diagram of the unit 21 in FIG. 2;

FIG. 5 shows an embodiment of a circuit 53 in FIG. 4;

FIG. 6 shows the programming matrix 24 in FIG. 2;

FIG. 7 shows the safety matrix 25 in FIG. 2;

FIG. 15 is a detailed diagram of the unit 1441 in FIG. 14;

FIG. 16 is a detailed diagram of the unit 148 in FIG. 14;

Figure 1:
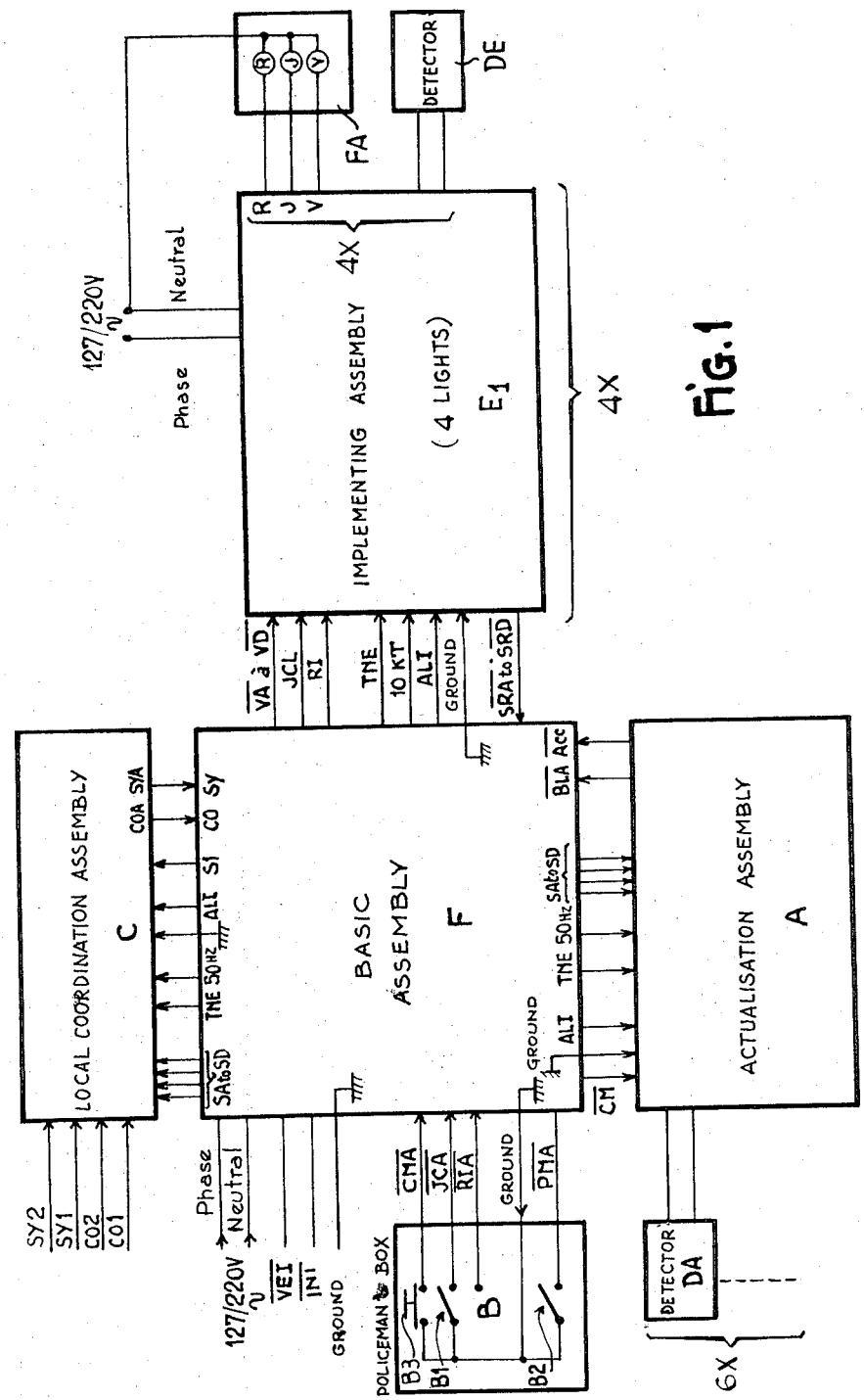
FIG. 1 is a general diagram showing the various functions of a crossroads controller according to the invention.

FIG. 1 shows the general structure of a crossroads controller according to the invention. This drawing likewise shows the signals and the lines of connection which are used in the crossroads controller according to the present invention. Generally speaking, a line of connection will be designated by the same reference as the signal which it transmits.

The crossroads controller according to the invention comprises a basic assembly F which is intended to supply all the electrical and electronic circuits, with suitable control signal or power except for the filaments of the lamps. This basic assembly receives the two Phase and Neutral wires of the 127 or 220 volts AC mains. In the present description, it is considered that the frequency of the AC mains is 50 Hz; if the frequency is 60 Hz, the changing of one logic counting circuit permits of functioning under the same conditions as hereinafter described.

The basic assembly likewise receives two binary signals of external origin which are represented by VEI/ and INI/.

(Hereinafter in the text of this detailed description, the complementation of a logic signal will be represented by an oblique bar following the designation of this logic signal. However, in the logic equations and in the drawings, the complementation will be represented in the conventional manner by means of a line over the top.)

The signal VEI/ corresponds to a command to dim the filaments of the bulbs of the traffic lights. This signal is at the level ONE when it controls normal functioning, and at level ZERO when it controls a dimming function command. The signal INI/ corresponds to an inhibiting command which will be described in greater detail hereinafter. It is at level ONE in the absence of an inhibiting command and at the level ZERO for transmitting an inhibiting command.

As will be described in greater detail hereinafter, the basic assembly generates a plurality of repetitive cycles, each of which is allocated to the control of a different light set. These cycles are of the same duration and simultaneous. They are comprised of a plurality of sequences (16 in number in the preferential embodiment described), with their total common duration being the sum of all the sequence durations, and are differentiated in respect of one another according to various programmed control signals transmitted for the various cycles during each of the said sequences. The duration of each sequence is adjustable from a time base in the basic assembly, either as a function of a programme in the basic assembly or as a function of influences external of the basic assembly.

The first source of external influences is a policeman's box B which allows a certain number of controls to be carried out by the traffic policeman. This policeman's box has two controls provided by the selector switch B1 (FIG. 1) corresponding to signals JCA/ and RIA/. When these signals are in open circuit in respect of ground (level ONE), no command is transmitted. When one of the signals JCA/ and RIA/ is connected to ground via the selector switch B1, the policeman controls the generalised operation of FLASHING AMBER and ALL RED respectively. (ALL RED corresponds to a condition where all the lights controlled by the basic assembly are at RED.)

The policeman's box likewise provides a signal PMA/ via a push button B2. The signal PMA/ is at ZERO level when the policeman wishes to exercise manual control at the end of the sequence. This manual control only takes effect if the switch B3 is closed, which causes a signal CMA/ to pass at level ZERO.

The other external influences exerted on the actual duration of sequences originate from the local coordinating assembly C on the one hand and the actualisation assembly A on the other. In order that they may achieve a shortening of the sequence in progress, these two units receive, via the lines SA to SD, counting data to provide a representation of the sequence in progress in the basic assembly. These assemblies A and C likewise receive from the basic assembly a ground connection, the positive voltages ALI for feeding the electronic circuits and for representing the logic level ONE for these circuits. (In the drawings, + represents the positive voltage corresponding to the logic level ONE of the electronic circuits, while + Vo is the electronic DC supply voltage.) These two assemblies A and C furthermore receive the signal TNE which is a square signal at the frequency of 1Hz (or at a more rapid frequency in the case of testing of the crossroads controller) and a signal 50Hz which is a square signal at the frequency of 50Hertz.

The actualisation assembly alone receives a signal CM/, for purposes which will be described hereinafter. It returns to the basic assembly F a time accelerating control signal Acc/, a so-called actualisation blocking signal BLA/ capable of preventing passage from one sequence to the next sequence.

The main function of the actualisation assembly A is, for each sequence identified by the lines SA to SD and according to the indications given by detectors such as DA, to modify the actual duration of the sequence in progress by means of an acceleration signal Acc/. Another function of the actualisation assembly A is if necessary to establish a connection between the basic assembly and a centralised traffic control point, by its possibilities of acceleration over the various sequences, and the various associated circuits.

The local co-ordinating assembly C receives an item of information S1 when the sequence S1 which is the first of the cycle is in progress. The assembly C likewise receives signals SY1, SY2, CO1 and CO2 originating from external lines in a manner which will be described in greater detail hereinafter. The signals CO1 and CO2 are intended to represent the fact that several basic assemblies engender co-ordinated cycles. The signals SY1 and SY2 provide, in the form of pulses, characteristic instance of synchronisation which are useful in achieving the said co-ordination. After having transformed them, the assembly C derives from these signals corresponding signals CO and SY which are passed over the basic assembly F to control the end of one or more sequences.

The basic assembly F is likewise connected to a plurality of implementing assemblies E1 to E4, of which one only is shown in FIG. 1. The implementing assembly E1 represented by way of example controls four different lights, according to four different light control cycles.

This implementing assembly E1 likewise receives the two aforesaid connections Phase and Neutral from the 127/220 volts AC supply. The bulbs of the lights FA are connected on the one hand jointly to Neutral and on the other separately to the implementing assembly which selectively supplies the phase voltage from the mains to one of the lines RED R, AMBER J and GREEN V. Each implementing assembly can likewise be connected to a detector DE for a reservation function to be described hereinafter. Each implementing assembly receives from the basic assembly F the ground connection, the supplies ALI, the signal 10KT which is substantially at the frequency of 10KHz and the signal TNE which corresponds in normal operation to a square signal of frequency 1Hz.

Each implementing assembly E also receives complemented GREEN control signals such as VA/ to VD/ for the lights A to D associated with the assembly E1 in FIG. 1. As will be explained hereinafter with reference to FIGS. 10 and 11, each implementing assembly includes control and timing circuitry. By virtue of the provision of this control and timing circuitry, the implementing assembly is adapted to gate current to illuminate the AMBER lamp during a portion of the time while a not-GREEN-light condition is ordered and to gate current to illuminate the RED lamp during another portion of this time. Each implementing assembly also receives FLASHING AMBER and ALL RED JCL and RI control signals. Finally, each of the assemblies E1 to E4 returns a complemented safety signal which is at the level of ground or level + Vo according to whether the RED bulb of the corresponding light is on or not. These signals are SRA/ to SRD/ for the lights A to D of the assembly E1 in FIG. 1.

Figure 2:
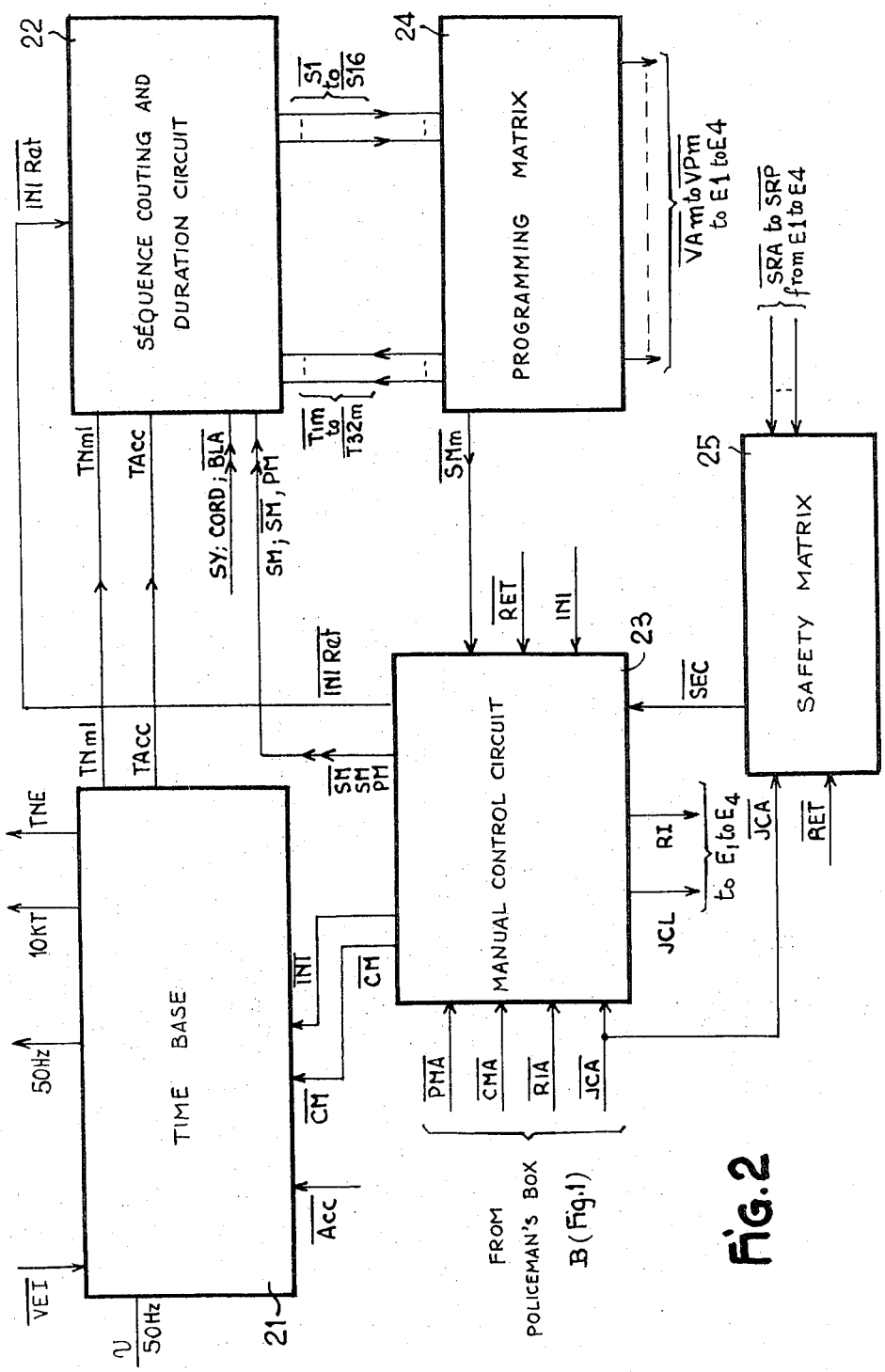
FIG. 2 shows a diagram illustrating the principle of the basic assembly F in FIG. 1.

FIG. 2 shows a diagram illustrating the principle of the basic assembly F in FIG. 1. The basic assembly comprises a continuous supply circuit (not shown), which likewise provides a 50 Hz sinusoidal signal derived from the AC mains to a time base circuit 21. The circuit 21 also receives signals for dimming VEI/, inhibition INI/ and acceleration Acc/, as well as the signal CM/ which is derived from the signal CMA/ as will be seen hereinafter. The time base 21 provides for the crossroads controller circuit assembly square signals at 50 Hertz, designated by 50Hz, square signals at 10kHz intended for the implementing assembly and designated by the reference 10KT, and square signals at 1Hz under normal operation, designated by the reference TNE. The time base supplies to a sequence counting and duration circuit 22 two basic times (i.e., signals, each having a different predetermined frequency), TNm1 and TAcc, a selected one of which is used to step the counting circuit 22. Under normal functioning, the time TNm1 is transmitted. Under accelerated operation (particularly by the condition $\overline{Acc} = 0$), the accelerated time is transmitted. The accelerated time is at the frequency of 10kHz; the normal time is at 1Hz or 0.5Hz in normal operation, possibly 5Hz during tests of the crossroads controller on a rapid time basis. The circuit 22 receives in addition to the time base signals 21, a retarded inhibition signal INIR at/, signals originating from the local co-ordination Assembly C and actualisation assembly A, which are the signals SY, CORD derived from CO, and BLA/. It also receives signals originating from a manual control circuit 23, which are SM, SM/ and PM.

The circuit 22 supplies to a programming matrix 24 sequence counting data after decoding, on lines S1/ to S16/, One of these lines is at logic level ZERO when the corresponding sequence is in progress. As a function of this data and the programming, the matrix 24 returns via one of the lines T1m/ to T32m/ data of programmed duration of the sequence in progress, to the sequence counting and duration circuit 22. According to the programming, the matrix 24 likewise passes to the manual control circuit 23 a signal SMm/ which is at ZERO level when a manual control is permitted on the frequency in progress. Finally, the programming matrix 24 passes over a plurality of lines complemented GREEN control signals such as VAm/ to VPm/ to implementing assemblies E1 to E4, as illustrated by E1 in FIG. 1.

The manual control circuit 23 processes the control signals originating from the policeman's box B, in other words the signals PMA/, CMA/, JCA/ and RIA/. It likewise receives the signal INI of external origin. It also receives a retard signal RET/ engendered at the time of setting the crossroads controller in operation, to control a short period of FLASHING AMBER. This circuit 23 generates FLASHING AMBER and ALL RED control signals JCL and RI, passing them to the implementing unit E1 to E4 such as E. It likewise generates signals CM/ and INI/, derived respectively from CMA/ and INI, in the direction of the time base 21, signals SM/, SM and PM in the direction of the sequence counting and duration circuit 22, and also the signal INIRet/ for this same circuit.

The basic assembly also comprises a safety programming matrix 25. This matrix provides an output signal when, among the lights programmed as being on opposing roads, more than one does not have a RED. This output signal SEC/ is transmitted to the special control circuits 23 for controlling a FLASHING AMBER. The signal SEC/ is inhibited by a FLASHING AMBER condition of external origin, that is to say either the FLASHING AMBER controlled by the policeman, JCA/, or the signal RET/, these two signals being transmitted to the safety matrix 25. From each of the implementing assemblies (E1 to E4), this matrix receives the signals SRA/ to SRD/ which represent the presence of an illuminated RED in the lights A to D respectively. The units 21, 22, 23, 24, and 25 in FIG. 2 are shown in greater detail in FIGS. 3, 4, 6, 7 and 8 respectively.

The time base circuit 21 (FIG. 2) of the basic assembly will now be described in greater detail with reference to FIG. 3, A part of the time signal is derived from the frequency of the AC mains, which is carried over the input line Eh. These signals Eh at the frequency of 50 Hertz are taken from a supply transformer, not shown.

They are transmitted to a forming stage 31, which has as its output signals 50Hz which are square signals at the frequency of 50 Hertz. These signals are transmitted to a division stage 32 which, according to the internal settings of the crossroads controller, that is to say those which cannot be modified during course of operation, makes it possible to effect division by 10, by 50 or by 100 of the frequency of the square signals at the output from the forming stage (or by 12, 60 and 120 for a 60Hz mains).

The signals of which the frequency is divided by 10, that is to say signals of 5Hz, are available at the output R from the divider stage 32. They correspond to a relatively rapid functioning at 5Hz. This frequency is used only for simulation tests with a rate of change of lights condition which is too rapid for suitably controlling traffic, but which allows experimenters to observe the satisfactory operation of the crossroads controller. As will be seen hereinafter, the duration of the AMBER, which is determined according to values available by construction in the implementing assemblies, in relation to the time TNE, is modified proportionally during this operation.

The output signals N, of which the frequency is divided by 50, which are therefore at 1Hz, are the signals normally used as timing signals for the basic assembly.

The signals of which the frequency is divided by 100, available at the output L from the divider stage 32, are used for certain crossroads on heavy traffic routes, when the duration of all the sequences has to be extended. These signals therefore serve as timing signals in certain particular cases.

The signals N and R, when they are used, are transmitted to the assemblies A, C and E1 to E4 connected to the basic assembly, particularly as a reference for the duration of the AMBER. As in fact only one of these two signals exist at a time, FIG. 3 diagrammatically shows an OR gate 33, the output of which furnishes the reference time TNE at the said assemblies.

One of the three output terminals from the divider stage 32 is chosen as illustrated by the selector switch 34 to supply the standard time to a NO-AND gate 35. It must be understood that this selector switch 34 is only a diagrammatic representation of the various division possibilities provided by the stage 32 according to the inter-connections of the elementary divider circuits which compose it.

The NO-AND gate 35 receives at one of its two inputs the normal time signal TN. The output of the gate 35 provides the normal time TNm1 when the second input of this gate is at condition ONE.

Also shown in FIG. 3 is an oscillator 36 which supplies at its output square signals at the frequency 10kHz, signals which are represented by the symbol 10K. These signals are on the one hand transmitted to the first input of a NO-AND gate 37, and when the second input of this gate is at condition ONE, they are furthermore available at its output to provide an accelerated time TAcc.

The changeover from normal time to accelerated time is therefore achieved by action at the two respective inputs of the gates 35 and 37. For this purpose, the second input of the gate 37 is connected by an inverter 38 to the second input of the gate 35 so that one of these two gates is necessarily conductive at a given moment.

The functioning of the circuit 22 at normal time TNm1 is then obtained when a level ZERO is applied to the second input of the gate 37, that is to say when the two inputs of the NO-AND gate 39 are at the level ONE. This first of all presupposes that the signal INI/ is at level ONE, that is to say that inhibition does not obtain. The other input of the gate 39, which must be at level ONE, is connected to the output of a NO-AND gate 40. One of the inputs of this gate 40 is the signal CM/, which is derived from the aforesaid signal CMA/ and corresponds to the presence of a policeman and possible manual controls. The other input of the gate 40 is a signal Acc derived via an inverter 41 from a signal Acc/. The signal Acc is therefore at level ONE on the occasion of an acceleration command originating from the actualisation assembly A in FIG. 1. When the signals CM/ and Acc are simultaneously at level ONE, the output of the gate 40 is not at level ONE, and the accelerated time TAcc is applied. The acceleration can therefore be achieved either by the signal Acc in the absence of manual control operation, or by the signal INI/ in the conditions which will be described hereinafter, and which aim to cause a return to the commencement of the first sequence.

Furthermore, a NO-AND gate 42 receives via one of its inputs a dimming control signal VEI intended to produce a reduction in the intensity of illumination of the traffic light bulbs, or their extinction, for example when it is night, and derived after inversion of a signal VEI/.

The second input of the NO-AND gate 42 is connected by a selector switch 43, either to a + source of continuous voltage affording a condition ONE, or to the output of the forming stage 31, which then supplies to it square signals 50Hz at the frequency of the AC mains. According to the position of the switch 43, so the corresponding input of the NO-AND gate 42 is therefore permanently at condition ONE, or may vary from condition ONE to condition ZERO substantially in synchronism with the AC mains. When the dimming control signal VEI is at level ONE at the other input of the gate 42, the output from this latter varies as does its other input. The output signal of the gate 42 is then transmitted to one input of a NO-AND gate 44, the other input of which receives the signals at 10kHz available at the output of the oscillator 36. The output of the NO-AND gate 43 provides signals 10KT which serve to operate triacs which act as make-and-brake switches to control the lights in the implementing assemblies associated with this basic assembly.

Operation is as follows. When the signal VEI is at level ZERO (no dimming control), the output of the gate 42 is at condition ONE, the output of the gate 43 then varies permanently at the frequency of 10kHz and the triacs will be operated for the two alternations of the AC mains. On the other hand, in the presence of a VEI control signal, at level ONE, the output of the gate 42 is at condition ZERO, in other words only during the alternations of the mains in the same direction, or permanently according to the position of the switch 43. Consequently, either the pulses 10KT are transmitted to the triac only during one alternation in two, or they are never transmitted.

The sequence counting and duration circuit 22 in FIG. 2 will now be described in greater detail with reference to FIG. 4. The input of this main counter is constituted by a gate 51 of the NO-AND type having three inputs and one output. Two of the inputs of this gate 51 receive the normal time TNm1 and accelerated time TAcc respectively, originating from the NO-AND gates 35 and 37 respectively. When the third input is in the condition ONE, the NO-AND gate 51 will therefore, for its output, provide a signal TCP which is one of the two normal time TNm1 and accelerated time TAcc.

These signals TCP are passed through a binary counter 52. The counter 52 consists of a plurality of bistables in which the true output from one bistable is connected to the releasing input of the next, in known manner, Thus, for each bistable, a division by 2 is obtained, and the whole of the output conditions of the various bistables provides a binary numerical presentation of the number of pulses applied to the releasing input of the first bistable of the counter.

Figure 4:
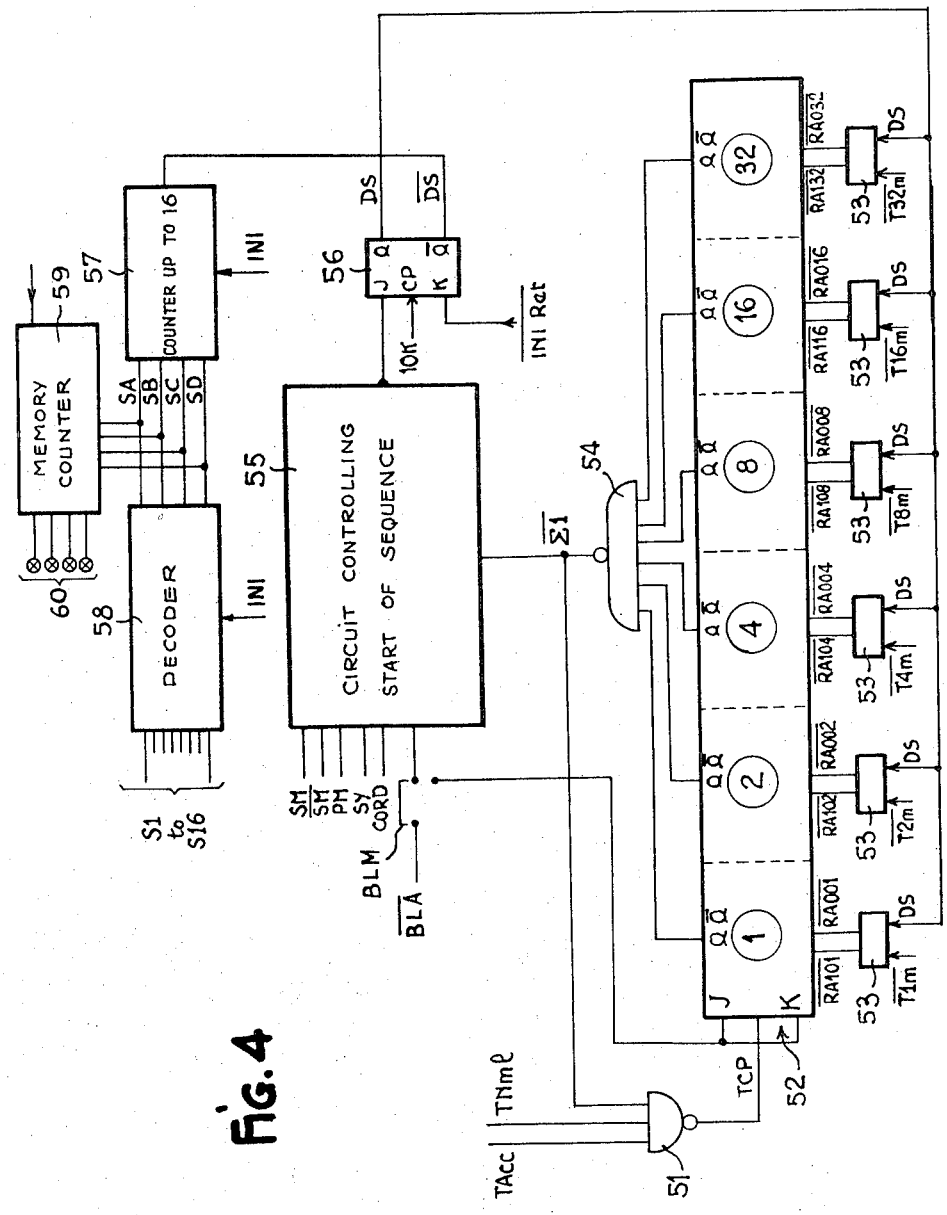
FIG. 4 is a detailed diagram of the unit 22 in FIG. 2.

In FIG. 4, the counter 52 is shown diagrammatically in the form of a block. The true output Q and false output Q/ of each bistable are placed above an encircled figure which represents the binary numerical weight of the output condition of the said bistable.

For each bistable and below the corresponding encircled figure are shown excess weight inputs which make it possible, when a logic state ZERO is applied to them, to apply excess weight to one of the outputs of the bistable corresponding to the condition ONE. Thus, for example, the input RA101/ allows excess weight to be applied to the condition ONE of the output Q of the bistable of weight 1, and the input RA001/ permits the output Q' of the bistable of weight 1 to be increased in weight to condition ONE. It goes without saying that the two outputs of one and the same bistable must necessarily remain in complementary conditions.

It is thus possible, by means of the outputs RA/ of the counter 52, to force or bias this latter to a selected binary count from which it will then start to count the pulses TCP available at its input.

This forcing is achieved by means of control signals from which, at the start of each sequence, the true or false condition is engendered (respectively binary ONE or ZERO) of each of the bistables of the counter 52. Thus, the condition of the outputs Q and Q/ of the bistable 1 is controlled by the inputs RA101/ and RA001/. These two signals are not independent, because it is known that, in order to force a condition in a bistable, one of the forcing signals must be ZERO, the other ONE. Therefore, these two signals will be engendered from one and the same control signal T1m/, in the manner indicated hereinafter. The signal T1m/ corresponds, when it is ONE, to the forcing of a binary 1 in the corresponding bistable, that is to say to forcing of the true output Q to level ONE. The circuits such as 53 which allow passage of each pulse Tm/ to the associated signals RA/ will be described in greater detail hereinafter.

All the true outputs Q of the bistables of the counter 52 are transmitted to an equal number of respective inputs in a NO-AND gate 54. The output signal $\Sigma 1/$ of this NO-AND gate will therefore be a level ZERO only when all the bistables of the counter 52 have their true output at condition ONE, that is to say when they are all indicating a binary 1.

In the particular case shown in FIG. 4, where the counter 52 consists of six bistables, the signal $\Sigma 1/$ at the output of the NO-AND gate 54 will be at level ZERO for a binary counting of 111 111, that is to say of 63 in decimal numeration. The counter 52 therefore has a maximum counting capacity of 63 units of normal or accelerated time.

This signal $\Sigma 1/$ is applied to the third input of the aforesaid NO-AND gate 51. This renders this gate conductive only when the maximum counting is not attained in the counter 52. It follows that this counter will stop every time it reaches its maximum counting, and that it will not be able to resume counting until it has been forced to a counting value below 111 111.

The signal $\Sigma 1/$ is likewise transmitted to a circuit 55 which controls the commencement of the following sequence, the logic structure of which has not been shown in detail, with an intention to provide simplification, and of which simply the logic operating equation will be given:

$$[\overline{\Sigma 1 . \overline{(BLA)} . \overline{(CORD . SM)}} . \overline{[SY . \overline{(BLA)} . \overline{(CORD)} . SM]}$$

$$\overline{[(SM . PM . [\overline{\Sigma 1 . BLA . SM} . COP]}$$

This equation is expressed in terms of logic at NO-AND gates. According to the well-known treatment of logic circuits by MORGAN's theorem, the same equation can be written: $[\Sigma 1 . \overline{(BLA)} . \overline{(CORD)} . \overline{SM}] + [SY . \overline{(BLA)} . (CORD) . \overline{SM}] + (SM . PM) + [\Sigma 1 . \overline{BLA . SM} . COP]$ The signal SM is at level ONE when the sequence in progress can be terminated at the control of a policeman. The signal PM is ONE at the moment when this end of sequence command is given. The signal CORD is ONE on the occasion of co-ordinated functioning and the signal SY (synchronisation) is ONE at the moment when the synchronisation signal is present. The signal BLA is ONE at the time of blocking by order of the actualisation assembly.

The first term of the second logic equation indicates that the commencement of sequence is provided by the signal 1 in the absence of actualisation blocking, co-ordination on the sequence in progress, and functioning under manual control on a sequence where this functioning is programmed as authorised. The second term of the same equation indicates that the commencement of a sequence is provided by the synchronisation signal SY when co-ordination is achieved on the sequence in progress (CORD) and in the absence of actualisation blockage and authorised manual operation. The third term of this equation indicates that the commencement of sequence is provided by action of the policeman on the push button B2 (PMA/ = 0 or PM = 1), when functioning under manual control is authorised by the programme for the sequence in progress.

The fourth term provides for operation in "floating" co-ordination when a switch COP (not shown) it causes to provide a signal ONE.

In this case, the co-ordination provides a synchronisation signal SY which is taken into account only if it arrives before the signal $\Sigma 1$.

Alternatively, a switch BLM makes it possible to cause the signal BLA to act on the inputs J and K of the first bistable of the counter 52, or on the NO-AND gate 51 so that actualisation blockage intervenes into the sequence in progress (generally at its commencement) and not the commencement of the following sequence. In this way, actualisation blockage on a main road is prolonged in many cases.

The output signal of the circuit 55 is applied to the input J of a bistable 56 of type JK, of which the input K receives a signal INIRet/, and of which the releasing input CP receives the signals at the frequence of 10kHz originating from the oscillator 36 in FIG. 3. The real output Q of the bistable 56 provides a sequence commencement signal DS which is at the logic level ONE when one of the terms of the second logic equation above is verified. The output Q/ of the bistable 56 provides the complementary signal DS/. The signal DS is passed to all the circuits 53 as a condition necessary for forcing the counter 52 to counting as operated by the various inputs Tm/. The signal DS/ is passed to a counter 57 which serves for counting and numbering the successive sequences, which are 16 in number in the embodiment described. The counter 57 comprises four binary counting stages, and four output SA, SB, SC and SD, of which the weights are respectively, 1, 2, 4 and 8. Since counting 000 has a meaning (first sequence), the number of sequences which can be counted, therefore differentiated, are therefore 16. The four output lines SA to SD of the counter 57 are transmitted to a decoder 58 having 16 output lines. The decoder 58 has one output line and a single one in a condition different from that of the other output lines for a given counting of the counter 57.

Preferably, the output lines of the decoder 58 function in inverse logic, that is to say the output line of the decoder 58 which corresponds to the sequence being presently counted by the counter 57 is at level ZERO, while the others are at level ONE. This is represented logically by the fact that the outputs of the decoder 58 are designated by references S1/ to S16/, with an oblique bar to indicate the complementation.

The counter 57 and the decoder 58 are of the inhibition type, that is to say they each have an input which allows their operation to be prevented. These inputs receive the aforesaid signal INI. When the signal INI is at level ONE, the decoder 58 provides no indication of sequence at output, that is to say all the outputs are at condition ONE, while the counter 57 is restored to 0000.

Very advantageously, a memory counter 59 is connected to the outputs SA to SD of the counter 57 to re-copy its counting and display it in binary form on indicators 60. This allows a display of the sequence in progress. The counter 59 is preferably blocked by the safety signal SEC described hereinafter, which furnishes an indication of the sequence in respect of which the safety has been triggered, while the counter 57 continues to operate as will be seen hereinafter.

A detailed form of embodiment of one of the circuits 53 in FIG. 4 will now be described with reference to FIG. 5. The references of the signals correspond to the circuit allocated to the signal T1m/.

In FIG. 5, the signal T1m/ is applied to the input of the circuit 53. This signal is first of all combined with the signal DS via a diode 531 to give the logic function $\overline{DS} + T1m$. When this function provides a logic level ONE, this ONE is transmitted by the diode 532 to the base of a transistor 533 which is then conductive. The signal available at the collector of this transistor and therefore the complement of the logic function written above, that is to say $T1m + \overline{DS}$. This signal is passed directly to the input RA101/ of the first bistable of the counter 52 according to the logic equation RA101 = T1m. DS. It is likewise transmitted to the first input of a NO-AND gate 534, the second input of this gate receiving the signal D.S. The output of the NO-AND gate 534 provides the signal RA001/, which then obeys the logic equation: RA001 = T1m. DS.

Thus, at the moment when DS = ONE, a binary 1 or 0 will be forced according to whether $\overline{T1m}$ is ONE or ZERO respectively.

The elements of the basic assembly which have been described with reference to FIGS. 3 to 5 therefore comprise a time base capable in controlled fashion of providing a normal time (capable of having three different values), or an accelerated time, to a counter which stops whenever it reaches its maximum counting, and counts only when it is at, or has been forced to, a counting value below this maximum counting. Forcing is carried out by operation on the signals T1m/ to T32m/.

Whenever the false output Q/, hence the signal DS/, passes to the level ZERO, the sequence counter 57 is increased by one unit, which is representative of the passage from one sequence to the next. This counter 57 being without hold, that is to say looped on itself, the sequence which follows the sequence S16 is the sequence S1. As has already been stated, the sequence in progress is indicated by a logic level ZERO on one of the lines S1/ to S13/. Finally, it has likewise already been mentioned that manual intervention by a traffic policeman is possible only on certain sequences.

Advantageously, to each of the sequences corresponds a programmed GREEN or GREEN/ order or control command, which remains the same throughout the whole sequence, as has already been stated.

Figures 6, 7:
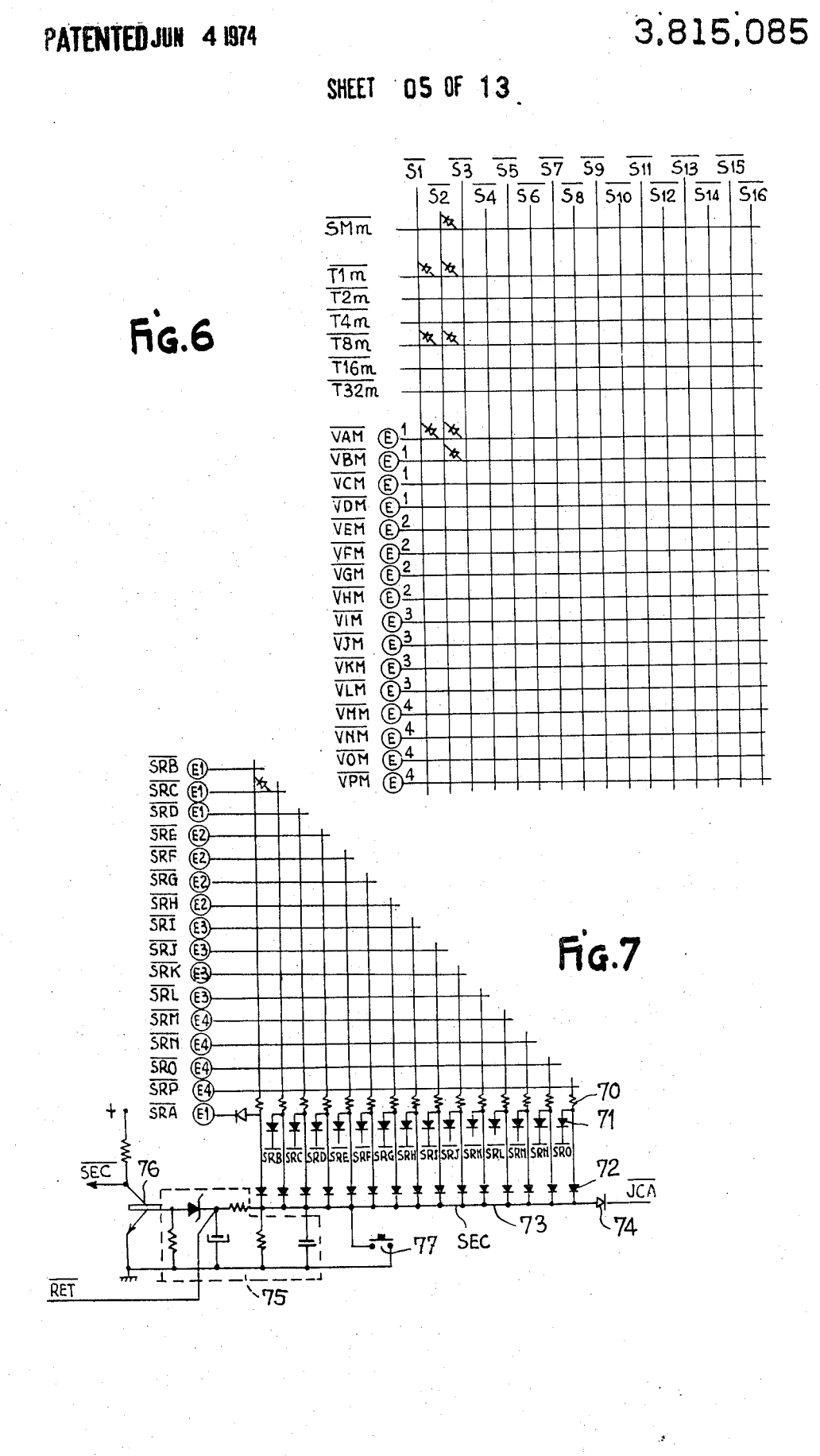

According to the invention, this programming is achieved by means of a single matrix shown in FIG. 6, which allows programming of the duration of each sequence, the possibility of intervention by a traffic policeman, and GREEN/ orders for a certain number of lights.

The GREEN order being sufficient for each set of traffic lights, to define its functioning cycle, it is advantageous to provide for a number of GREEN/ orders equal to the number of successive programmed sequences, which is therefore the same as the total number of the different control cycles.

In FIG. 6, the connections S1/ to S16/ are represented in columns of the matrix. The first line of this matrix provides a signal SMm/. The six lines situated immediately underneath provide the signals T1m/ to T32m/. Finally, the 16 bottom lines VAM/ to VPM/ represent 16 different GREEN/ orders, for 16 different lights, hence 16 different control cycles.

As has already been stated, each of the implementing assemblies E1 to E4 of the embodiment described is capable of controlling four different sets of lights. That is why the 16 lines VAM/ to VPM/ of the matrix carry, in groups of four, the markings E1 to E4.

Programming is achieved in a very simple manner by means of known types of diode plugs which, as desired, establish a unidirectional electrical connection at the points of intersection between the lines and the columns of the matrix. The direction of conduction of the diodes is chosen from the line to the column at each point of intersection.

As the consequence in progress is indicated by a logic level ZERO, that is to say a voltage close to that of ground, each complemented order programmed by a diode plug will be translated into the form of a logic level ZERO on the corresponding line during the sequence in progress.

Thus, according to the connections shown in FIG. 6, the sequence S1 commences by forcing of the counter 52 to counting 63 − (8 + 1) = 54, it normally lasts 63 − 54 = 9 seconds; manual intervention by a traffic policeman is not possible ($\overline{SMm}$ = ONE), and this sequence corresponds to an absence of GREEN except for lights A (VAM/ = ZERO).

The sequence S2 will have the same duration, with the possibility of manual intervention ($\overline{SMm}$ = ZERO), and the sets of lights A and B are operated to GREEN ($\overline{VAM}$ = $\overline{VBM}$ = ZERO).

The basic assembly also comprises a safety programming matrix intended, as was previously stated, to ensure that the real condition of the lights at any moment shall satisfy certain conditions as regards the prohibition of traffic, that is to say the RED on the opposing roads.

To achieve this safety, for each of the sets of lights A to P, there is a RED safety signal such as SRA/ for set of lights A. These signals SR/ are generated in a manner which will be described hereinafter. Such a signal SRA/ is a level + Vo if the RED lamp is not actually illuminated, and at the true ZERO potential level (connection to ground) if the RED lamp is actually on.

The safety programming matrix shown in FIG. 7 comprises 15 electrical connections of lines linked respectively to all the signals SR/ except one of them, for example to signals SRB/ to SRP/.

The columns of the safety programming matrix in FIG. 7 are likwise constituted by 15 electrical connections (all except one different from the preceding, for example SRA/ to SRO/ ....). These 15 connections are connected respectively by resistors such as 70, each to a first diode such as 71, and to a second diode such as 72. Each first diode such as 71 has its anode connected to the associated resistor such as 70, while its cathode receives a signal SR, for example SRO/. Each second diode such as 72 likewise has its anode connected to one of the resistors 70, while the cathodes are all connected together.

Operation of the matrix in FIG. 7 can therefore be summarised as follows. When one of the signals of the line connections SRB/ to SRP/ is not at RED, it provides on its line a voltage of + Vo. Taking into account all the diode plugs which are plugged in at the point of intersection of the lines and columns of the matrix, these signals + Vo are each capable of engendering, via their resistor 70 and associated diode 72, a positive voltage signal corresponding to a logic level ONE, on a line 73, the logic level ONE being a + voltage below + Vo.

In fact, this happens only if the diode such as 71, associated with the corresponding column, has not short-circuited to earth the positive voltage present on the column.

It is therefore possible, by using the triangular matrix of FIG. 7, to programme at will all the combinations of opposing roads between the RED lights A to P.

The signal present on the line 73 is inhibited via a diode 74 when the condition JCA/ = ZERO is verified, that is to say when a traffic policeman is controlling the FLASHING AMBER, or gain by the signal RET/ which also controls the FLASHING AMBER.

The voltage preset on the line 73, which will now be referred to as SEC because it is at a level ONE when the safety conditions are not satisfied, is applied via an adaptation assembly 75, of known design, on the base of a transistor 76 of which the collector signal is therefore SEC/. The safety signal is passed to the circuit 23 in FIG. 2 to control the FLASHING AMBER (signal JCL/).

FIG. 7 likewise shows a push button 77 which serves to restore the traffic lights to normal operation after the anomaly detected by the safety device has been corrected.

The circuits which generate special control signals will now be described with reference to FIGS. 8 and 9.

It has already been stated that the manual control box could provide directly over two different lines two signals JCA/ and RIA/ which, when they are at ZERO potential (short-circuit), correspond respectively to a FLASHING AMBER command and an ALL RED command.

On the other hand, in the manual control condition which is represented by a short-circuit on the line CMA/, a traffic policeman may, by acting on a signal PMA/ (changing from potential ZERO by the push button B2), directly control the commencement of the following sequence.

Figure 8:
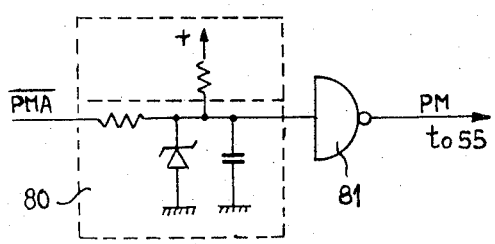

In FIG. 8, the signal PMA/ is applied to a network 80 consisting of a series resistance followed by a resistance for connection to the voltage +, and a Zener diode-capacitor parallel assembly connected also to earth. Other networks such as 80 will be found in the other drawings and particularly FIG. 9; they will not be described in greater detail because they are the adaptation of a short-circuit/ no circuit logic to the logic of the NO-AND circuits used. The signal available at the output from the network 80 is applied to a NO-AND gate 81 used as an inverter, to give the signal PM which serves to control the commencement of the following sequence when the condition SM = ONE is verified.

Figure 9:
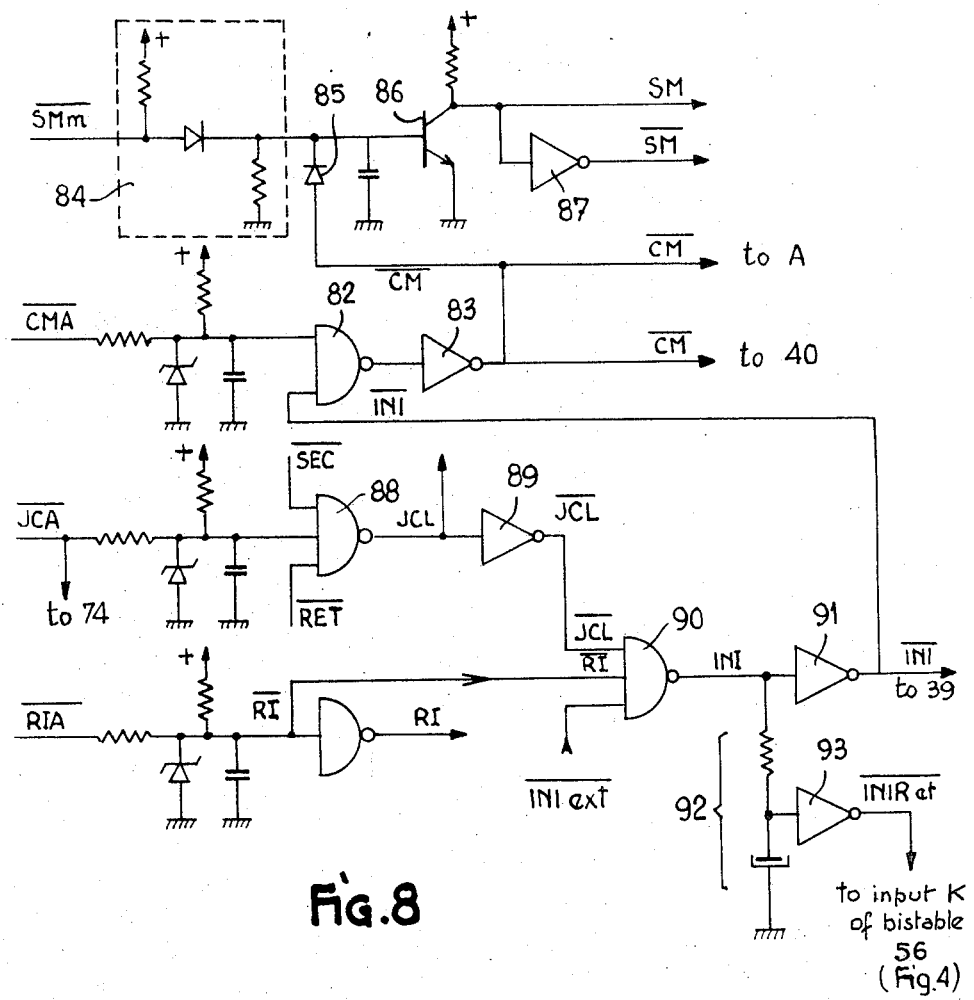
FIGS. 8 and 9 show the detailed embodiments of the circuit 23 of FIG. 2.

In FIG. 9, the signal CMA/ is applied via another network such as 80 to a NO-AND gate 82 which also receives the signal INI/. The output of the NO-AND gate 82 is therefore: CMA + INI. This signal is applied to an inverter 83 to give the signal CM/ which can therefore be generated either in response to a signal CMA/ or to a signal INI/ (the object of intervention of the signal INI/ will appear later).

As has already been stated, the signal SMm/ originates from the programming matrix of FIG. 6. It is at level ONE in normal time, and at level ZERO during sequences on which manual intervention by a policeman is allowed by the programming. This signal is applied to a network 84 consisting of a resistance for connection to the + voltage followed by a diode located in series in the passing direction and a resistance for connection to earth. At the output of this network 84, it is combined with the signal CM/ which is applied via another diode 85 to form in known manner an OR logic function with a diode: $\overline{CM} + \overline{SMm}$. This signal is inverted via a transistor 86, the collector voltage of which is therefore SM = SMm. CM. The signal SM/ is likewise available at the output of the inverter 87. The signals SM and SM/ are passed to the circuit 55 to achieve the logic function of this latter.

The signals SM, SM/, PM and CM/ are used for the following functions:

the signals SM/, SM and PM are passed to the circuit 55. When SM = ONE, the end of the sequence and commencement of the following sequence can occur only for SM . PM = ONE, that is to say when a policeman has called for manual operation and when this operation is authorized on the sequence in progress (SM = CM. SMm = ONE) and when the policeman has commanded the end of sequence $(\overline{PMA}$ = ZERO; PM = ONE)

the signal CM/ is passed to the gate 40 in FIG. 3 to prevent any acceleration when a policeman is supervising the traffic under manual control conditions ($\overline{CM}$ = ZERO);

the signal CM/ is likewise passed to the actualisation assembly to represent there the condition: $\overline{CM} = \overline{CMA} + \overline{INI} + \overline{RIA} + \overline{JCL}$, as will be seen hereinafter.

In FIG. 9, there is also shown a circuit similar to that in FIG. 8, for converting the signal RIA/ to RI/ to RI. The signal JCA/ is on the one hand passed, as has been stated earlier, to the diode 74 of the safety matrix in FIG. 7; furthermore, it is treated like the signal RIA/, except that an inverter gate of the NO-AND type 88 likewise receives the signal SEC/ which emanates from the safety matrix in FIG. 7, and the signal RET/ which is at the level ZERO for a predetermined lapse of time according to the operation of the crossroads controller, and then controls the FLASHING AMBER. The output from the NO-AND gate 88 is therefore JCL = JCA + RET + SEC. This signal is passed to the implementation unit to achieve the FLASHING AMBER condition. It is also inverted by an inverter 89 to provide JCL/.

The signals JCL/, RI/ and INIext/ which originate from external circuits, are combined in a NO-AND gate 90, the output of which is signal INI. This signal INI is passed through an inverter 91 to the NO-AND gate 82, as has already been stated. It is likewise passed to the gate 39 (FIG. 3) to effect an acceleration. After a delay, obtained by a resistance-capacitor network 92, the signal INI is converted by an inverter 93 and passed to the input K of the bistable 56 in FIG. 4 to control its maintenance in the real condition after the end of the acceleration commanded by the signal INI/ at the gate 39.

In this way, without the action of the signal INI, the following functioning is produced:

acceleration by the input INI/ of the gate 39, until 1/ = 0 is obtained, which arrests transmission of the accelerated time TAcc by the NO-AND gate 51;

a few moments afterwards, maintenance of the bistable 56 in the condition DS = ONE; $\overline{DS}$ = ZERO, which prevents any increment on the sequences counter 57;

zeroing of the counter 57 and inhibition of the decoder 58, this latter having then all its outputs S1/ to S16/ at level ONE.

So long as the signal INI is present, the basic assembly is therefore awaiting commencement of the first sequence.

Figure 10:
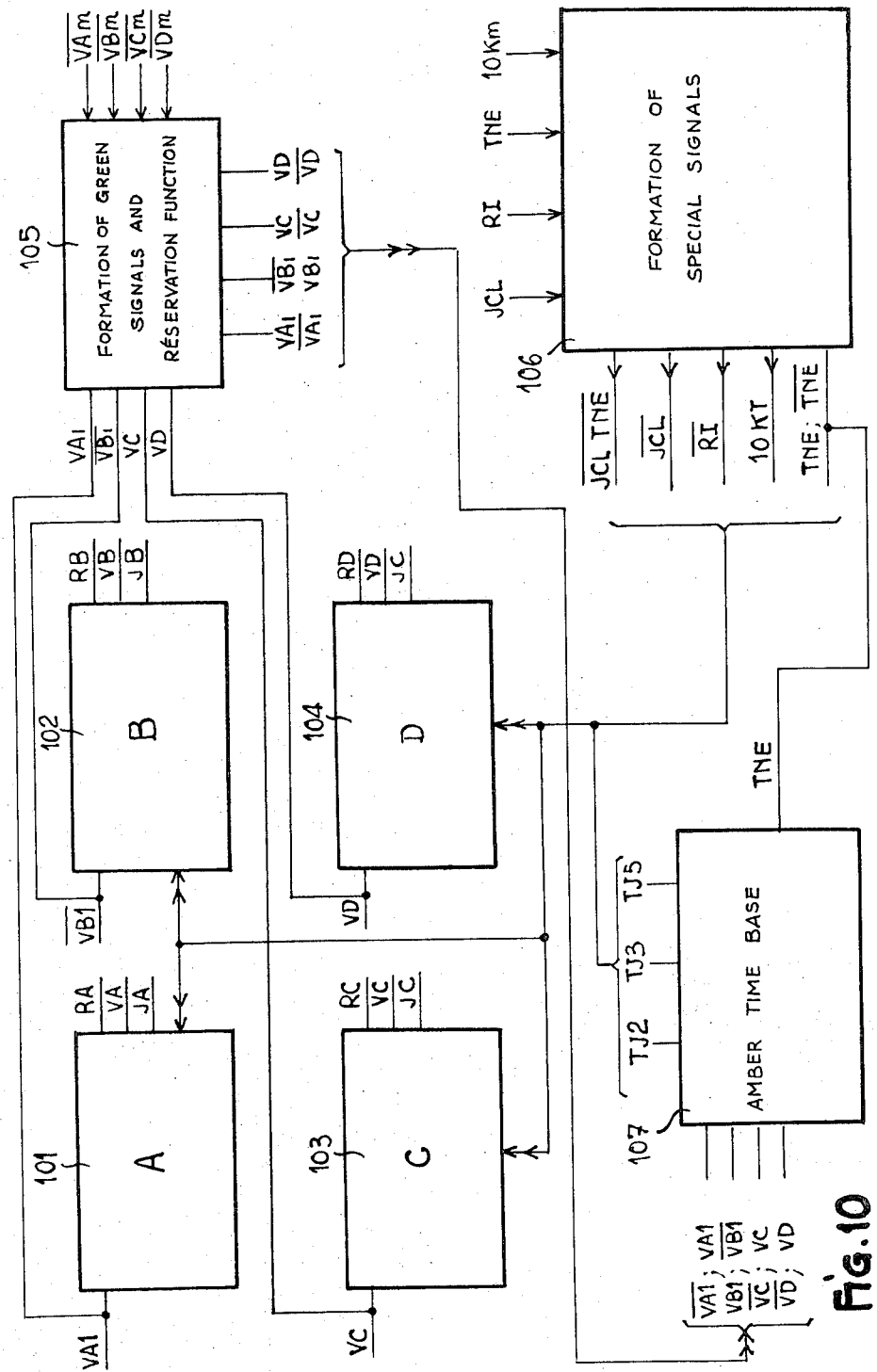
FIG. 10 is a diagram showing the principle of one of the four implementing assemblies of FIG. 1.

FIG. 10 shows the diagram illustrating the principle of an implementing assembly such as E1 for four sets of lights A to D, each set of lights generally comprising a RED lamp, a GREEN lamp and a YELLOW lamp (not shown). The implementing assembly E1 comprises four control circuits 101 to 104 respectively associated with the lights A to D. The output signals of each assembly are either the voltage of the neutral conductor of the AC supply mains or the alternating sinusoidal voltage of the phase conductor of the AC mains, so as to light up the corresponding bulb. These signals are available respectively on three output lines for each of the units 101 to 104, for example the RED line (RA), GREEN line (VA) AMBER line (JA) corresponding to the lights A controlled by the unit 101. Each of the units 101 to 104 receives GREEN control data obtained in a manner to be described hereinafter, from signals VAm/ to VDm/ originating from the basic assembly.

Each implementing assembly also comprises a circuit 105 receiving the said signals VAm/ to VDm/ and furnishing signals VA1/, VB1/, VC and VD. As will be seen later, the signals VA1/ and VB1/ do not necessarily correspond in a period of time to the signals VAm/ and VBm/. On the other hand, the signals VC and VD are the image of signals VCm/ and VDm/ after a simple adaptation to the logic circuit used in units such as 101 to 104. Each implementing assembly also comprises a unit 106 which receives the signals JCL, RI and TNE, and which effects a logic combination thereof, causing an inhibition of the FLASHING AMBER when an ALL RED is present, and a combination of the order of FLASHING AMBER with the signal TNE so as to provide a FLASHING AMBER control flashing at the frequency of the signal TNE, that is to say 1Hz. The resultant signal is called JCLTNE/.

The detailed diagram of the unit 101 in FIG. 10 will now be described with reference to FIG. 11, the other units 102 to 104 being identical, with the exception of their input signal (VB1/ particularly for unit 102).

Figure 11:
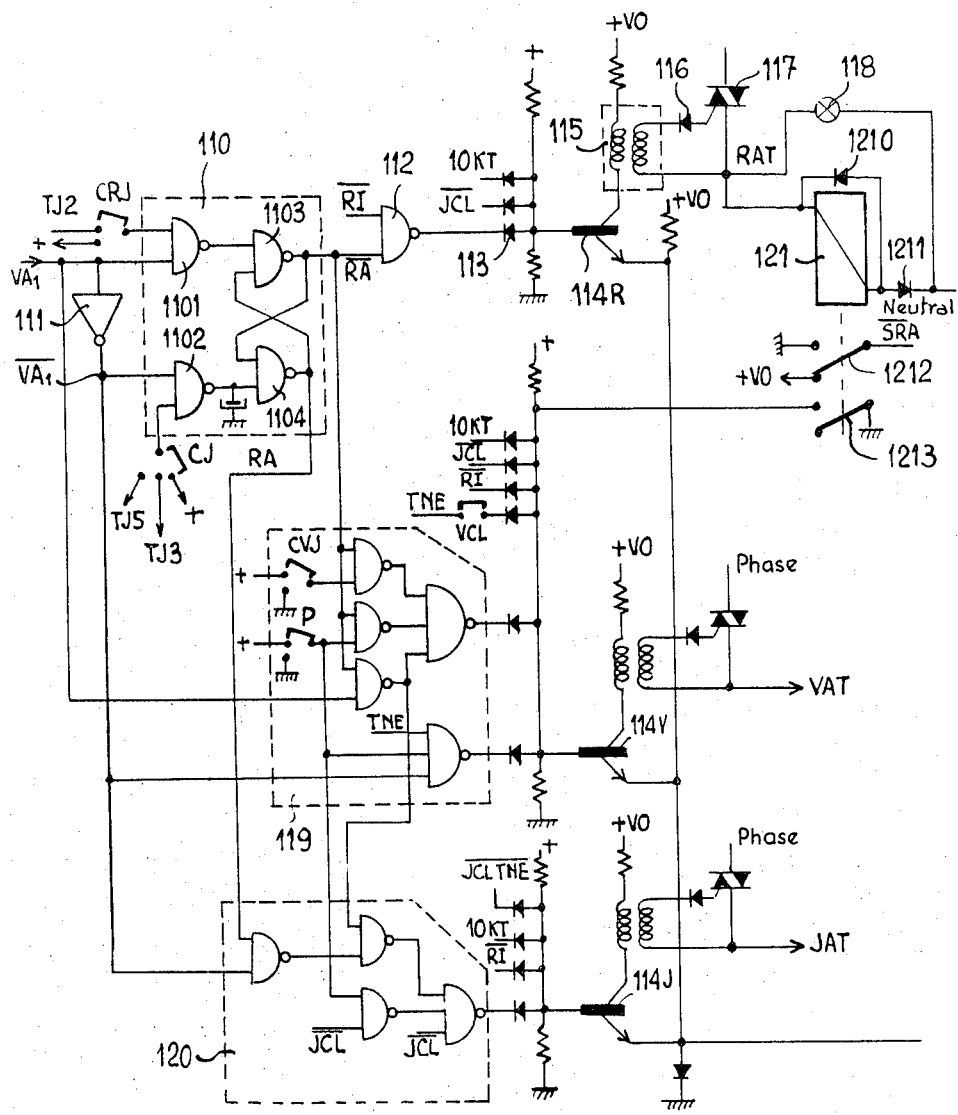
FIG. 11 is a detailed diagram of the unit 101 in FIG. 10.

In FIG. 11, the signal VA1 is applied to the input of a bistable 110 consisting of four NON-AND gates interconnected in known manner. The signal VA1 is applied directly to the NO-AND gate 1101 which likewise receives in a manner controlled by a RED AMBER switch CRJ, either the + voltage (level ONE) or a signal TJ2 retarded by two units of time TNE in relation to the commencement of the GREEN order. The signal VA1 is also inverted by an inverter 111 and transmitted to a NO-AND gate 1102 which also receives, in a manner controlled by a switch CJ, the signal + or the signal TJ3 or the signal TJ5, the signals TJ3 and TJ5 being retarded respectively by three and five units of time TNE in relation to the end of the GREEN order. The output stages of the bistable 110 are constituted by two NO-AND gates 1103 and 1104 coupled in a cross arrangement and reciving the output signals from the gates 1101 and 1102 respectively.

The output signal RA/ from the gate 1103 is applied to a NO-AND gate 112 which also receives the signal RI/ from unit 106. The output of the gate 112, which is at level ZERO in the absence of ALL RED or RED command emerging from the bistable 110, is applied via a diode 113 to control the polarisation point of transistor 114R which will therefore be blocked in the absence of any RED command. The signal JCL/ originating from the unit 106 in FIG. 10 is also applied via a diode to inhibit control of the RED light by blocking of the transistor 114R.

When the transistor 114R is not blocked, it is traversed by square signals 10KT likewise applied to its base via a diode. A transformer 115 located in the circuit of the collector of the transistor 114R then makes it possible, via a diode 116, to apply these square signals 10KT at the frequency 10 kHz to the control electrode of a triac 117. The triac 117 therefore begins to conduct virtually at the commencement of each alternation of the AC supply, which is applied to it by the phase conductor. However, as has been stated above, conduction by triacs such as 117 may be limited to one alternation in two, or completely inhibited, according to the action of the dimming control on the signal 10KT, an action which was described previously with reference to FIG. 3. The alternations of the mains are therefore transmitted via the triac 117 and a line RAT to a lamp 118 located so as to produce visually a RED light and of which the other terminal is connected to the neutral conductor of the A.C. mains.

The controls of the GREEN lights by VAT, and AMBER by JAT are carried out by identical circuits shown in FIG. 11, which will not be described in greater detail.

The output of the NO-AND gate 1104 of the bistable 110 furnishes a signal RA which is the complement of the signal RA/ mentioned previously. The signals VA1, VA1/ as well as RA and RA/ are applied to the logic circuits 119 and 120 which respectively provide control of the polarisation point of the transistors allocated to the GREEN and AMBER lights.

The polarisation point of the transistor 114V for the GREEN light can be brought to blocking condition either by application of the signal JCL/ or by application of the signal RI/ via respective diodes on its base. This transistor likewise receives the signal 10KT via a diode to operate the associated triac when the transistor 114V is unblocked. Finally, likewise via a diode but in a controlled fashion, via a switch VCL, it receives the signal TNE which allows operation under FLASHING AMBER conditions instead of GREEN (the colour being changed at bulb level), for example when concordant roads simultaneously have right of way.

Transistor 114J for the AMBER bulb may be inhibited by the signal RI/. It likewise receives the signal 10KT to operate the associated triac and the signal JCLTNE/ to operate under FLASHING AMBER conditions, the flashing occurring at the frequency of the signal TNE.

At the output from the bistable 110, the signal RA/ passes to the level ZERO as soon as the signal VA1/ passes to the level ONE (or VA1 to the level ZERO), or with a delay of three or five units of time TNE, according to the position of the switch CJ at the input of the gate 1102. Thus, between the GREEN order and the RED order, there is a lapse of time of zero three or five units to operate the AMBER order. Similarly, the signal RA passes to level ZERO at the moment when the signal VA1 passes to level ONE or two units of time after such movement, according to the position of the switch CRJ at the input of the gate 1101. This makes it possible to provide for a RED AMBER time of two units of time TNE at the commencement of the GREEN order and instead of the first two units of time from this commencement (in this case, the GREEN order does not exactly correspond to the actual duration of the GREEN).

The circuit 119 performs the following logic function:

$$\overline{(\overline{RA} . CVJ) . (\overline{RA} . P) . (\overline{RA} . VA1) + \overline{TNE} . (P . \overline{VA1})}$$

or $$\overline{(\overline{RA} . CVJ)} + \overline{(\overline{RA} . P)} + \overline{(\overline{RA} . VA1)} + \overline{TNE . (P . \overline{VA1})}$$

Shown in this logic function are the states of switches CVJ and P in the form of logic signals carrying the same references CVJ and P and which are at level ONE when the switches connect to the + voltage and at level ZERO when the switches connect to ground.

The first three terms of the second equation give a real GREEN either in the absence of RED in the case of GREEN AMBER (CVJ = 1) and the case of Pedestrians (P = 1), or in the absence of RED and during the GREEn order (normal case). The last term provides a FLASHING GREEN instead of AMBER for the pedestrain lights when $\overline{RA} = \overline{VA1} = $ ZERO.

In the same way, the circuit 120 provides the following logic function:

$$\overline{JCL . \overline{(JCL . P)} . \overline{(RA . VA1)} . \overline{(RA . \overline{VA1})}}$$

which can also be expressed thus:

$$JCL + \overline{JCL} . P + \overline{(RA . VA1)} + (RA . \overline{VA1})$$

The first term of the second equation provides the FLASHING AMBER in conjunction with the signal JCLTNE/ on the base of the transistor 114J. The second term allows illumination of the word WALK (instead of an AMBER lens or the WALK lights) and this in the absence of the FLASHING AMBER order. The third term provides an AMBER for the RA + VA1 exclusive complemented OR combination of RA and vA1, that is to say either RA . VA1 or $\overline{RA}$ . $\overline{VA1}$. The first case corresponds to the possible RED AMBER at the commencement of signal VA1 (at level ONE); the second case corresponds to the AMBER or GREEN AMBER immediately after the end of the signal VAL (at level ONE).

FIG. 11 likewise shows a relay 121 provided with diodes 1210 and 1211, in known manner, to avoid oscillation and procure stable operation. This relay is disposed in parallel with the lamp 118 allocated to RED. The characteristics of the triac 117, the lamp 118 and the relay 121 are chosen such that the relay is energized (contacts in the up position) when a current originating from the triac flows through the lamp 118 and when this relay does not have sufficient conductance for the triac 117 to be able to energise itself in response to pulses transmitted by the transistor 114 when the filament of the lamp 118 is blown or the line supplying the lamp 118 is broken.

The relay 121 is therefore in the energised condition only when there is an illuminated RED lamp 118. Associated with this relay 121 is a first moving contact 1212 which is connected to ground when the relay is energised and to the voltage + Vo when the relay is not energised. This contact 1212 provides the signal SRA/ used in the safety matrix 25 shown in FIGS. 2 and 7. A second moving contact 1213 connects the base of the transistor 114V to ground when the relay 121 is energised, so as to prevent any untimely illumination of the GREEN at the same time as the controlled illumination of the RED.

Figure 12:
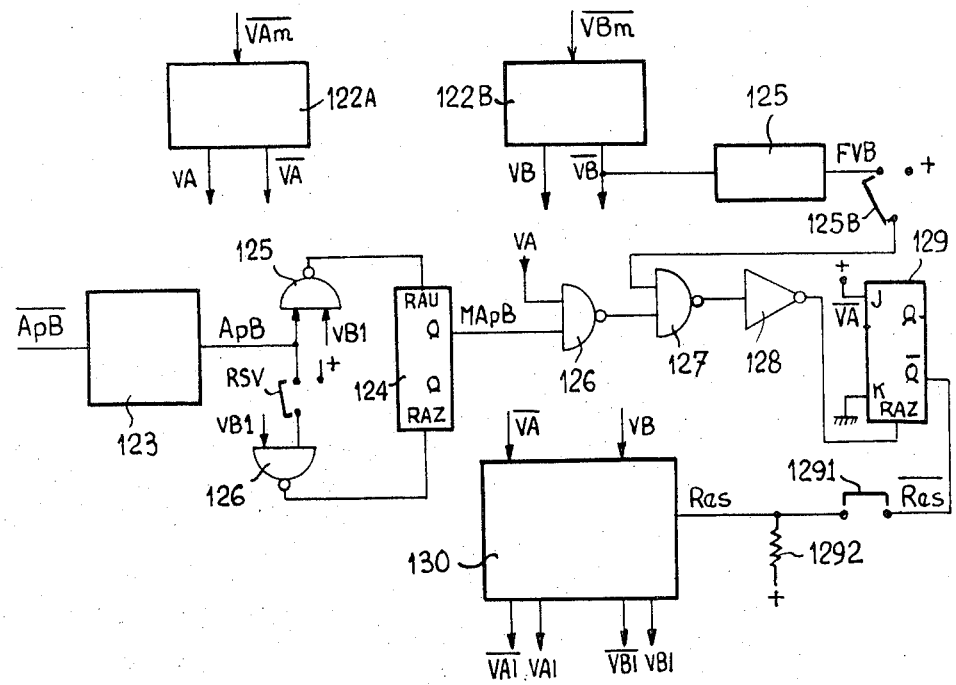
FIG. 12 is a detailed diagram of the unit 105 in FIG. 10.

The unit 105 in FIG. 10 which performs the functions of formulating signals VAm/ to VDm/ originating from the basic assembly, and which alo allows modifications of the GREEN orders for lights A and B in response to orders which originate from the basic assembly will now be described with reference to FIG. 12.

The four signals VAm to VDm take the form of a level ZERO for grounding, or a level ONE for opening the circuit. These orders are formulated as logic signals for the electronic circuits by adaptation assemblies 122A and 122B for lamps A and B in FIG. 12, and which provides at their outputs signals VA, VA/ in response to VAm/, and VB, VB/ in response to VBm/, respectively. Such units 122 are also used for the lights C and D but these are not shown in FIG. 12. In detail, their structure is the same as that which, in FIG. 9, provides for passage of signal SMm/ to SM and SM/, except, however, that the diode 85 is omitted.

The signals, VC, VC/, VD, VD/ which are thus obtained are passed directly to the circuits 103 and 103 and to a unit 107 (FIG. 10). On the other hand, the signals VA, VB and their complement may be the object of a change in response to a so-called reservation function which will now be described with reference to FIG. 12. By means of this reservation function, it is possible to replace the duration of GREEN A by the total duration GREEN A + GREEN B, according to the result of a vehicle detection performed by the detector (DE in FIG. 1), which provides a signal ApB at level ZERO when it detects the presence (or in certain cases the movement) of a vehicle, and a signal at level ONE in the contrary case. The signal ApB/ is formulated in a unit 123 which at the same time produces an invention. According to the actual conditions of the lights B, represented by the signals VB1/ and VB1, this signal ApB controls the condition of a call memory unit constituted by a bistable 124. The signal ApB is combined with the signal VB1/ in a NO-AND gate 125 to control forcing to the true state (call) on the input RAU of this bistable. This forcing takes place when a level ZERO is applied to the input RAU, that is to say in the condition ApB. $\overline{VB1}$ (that is to say detection and not GREEN). Forcing to the false state of the bistable 124 is commanded in the same way at its input RAZ by the logic combination of the output from a gate 126, that is to say according to the position of a switch RSV which connects the second input of the gate 126 either to the signal ApB or to the signal + (level ONE): VB1 . ($\overline{RSV}$ + RSV . ApB).

The switch RSV makes it possible for the zeroing signal RAZ of the bistable 124 to be dependent upon the nature of the detector DE used. For a presence detector, zeroing is carried out by the order GREEN B. For a movement detector, it can be made when there is a GREEN B, and movements, which is useful when there are a lot of stationary vehicles.

The output signal of the call memory unit 124 MApB is available at the output Q of this bistable. Another signal used is the end of GREEN B signal derived from the signal VB/ for the unit 125, the output from which is a signal FVB. According to the position of a switch 125 B, the signal FVB or a logic level ONE (voltage +) are used.

The aforesaid signal MApB available at the output Q of the bistable 124 is combined in the NO-AND gate 126 with the signal VA taken at the output from the assembly 122A. The output $\overline{MApB . VA}$ of the gate 126 is applied to a gate 127 which also receives either the signal FVB or a level ONE according to the position of the switch 125B. The output of the gate 127 is inverted by an inverter 128 and then applied to the input RAZ for forcing to the false condition ($\overline{Q}$ = ONE) a bistable 129. This bistable has its inputs J and K respectively at ONE and ZERO and is triggered by the signal VA/. The output Q/ of this bistable 129 supplies a signal Res/ which can be applied via a switch 1291 to a unit 130 receiving the signals VA/ and VB and providing the signals VA1, VB1 and their complements.

The logic function provided by the unit 130 is:

$\overline{VA1} = \overline{VA} . \overline{Res}$, that is to say VA1 = VA + Res, and also:

$\overline{VB1} = \overline{VB} . \overline{Res}$, that is to say $\overline{VB1} = \overline{VB}$ + Res The signal Res/ is therefore always at level ONE when the switch 1291 is open; this signal is at level ONE after a forcing by the input RAZ of the bistable 129, that is to say either when a Call is registered during the normal period of GREEN A (MApB . VA), or at each end of GREEN B (FVB = ONE) when the switch 125B is in the position FVB.

The signal Res/ is restored to level ZERO by the inputs J = ONE; K = ZERO, by the signal VA/ used as a timing signal, that is to say if there is no forcing operation while the signal VA is not at level ONE.

In this case (reservation), according to the position of the switch 125B, the GREEN A is permanent or stops at the end of the GREEN B (VAL = VA + VB). A call registered by the bistable 124 and existing during the GREEN A restores the GREEN B with its normal duration VB.

According to an alternative embodiment, the duration of the signal Res is made adjustable as a function of a non-usage time counter mounted like the circuits 147 to 149 hereinafter described, and the GREEN B is programmed before the GREEN A. Lapses of time are provided between the GREENS B and A, and possibly between the GREENS A and B, for so-called closing periods of AMBER and RED.

The detailed diagram of the unit 107 in FIG. 10 will now be described with reference to FIG. 13. This unit 107 performs the time base function for the period of AMBER from the signal TNE.

The signals VA1/, VB1/, VC and VD are applied to a first differentiating assembly 131 which differentiates them in known manner. The thus differentiated signals are combined in a NO-AND gate 132, the output of which is at level ONE for each commencement of A1, B1, C, D GREENS. This signal is transmitted to an inverter 133 and then to a switch 134 which connects an input of an NO-AND gate 135 either to the output of the inverter 133, in the position RED AMBER RJ, or to the voltage + representing the level ONE.

The signals VA1, VB1, VC, VD are applied to an identical second differentiating assembly 136, itself connected to a NO-AND gate 137, the output of which is at the level ONE for each end of GREEN A, B, C, D. This output signal of the gate 137 is applied via an inverter 138 to the second input of the NO-AND gate 135. The output of the gate 135 is applied to the zeroing input Ro of a counter 139 which counts the time pulses provided by the signal RNE at a counting input. The counter 139 has three outputs respectively providing the signal TJ2, TJ3 and TJ5 used to define the period of the AMBER in each of the units 101 to 104.

In this way, the counter is zeroed for each commencement or end of GREEN, and it provides the order for end of AMBER two, three or five units of time after such a commencement of end of GREEN. As has been previously stated, the commencements of GREEN are useful only if it is desired to utilize a RED AMBER condition simultaneously before the GREEN. That is why the switch 134 makes it possible to replace the commencement of GREEN signal at the output of the inverter 133 by a permanent level ONE.

No detailed description will be given of the unit 106 in FIG. 10, which carries out formulation in a known manner, with in addition two simple logic operations: the signal JC1/, which it provides at its output, is forced to level ONE in the presence of an ALL RED order, and the signal JCL which is thus formed is also combined with the time TNE to provide a FLASHING AMBER order, providing flashing at the frequency of the signal TNE.

The general diagram of the actualisation assembly A of FIG. 1 will now be described with reference to FIG. 14.

As already stated, the functioning of the actualisation assembly is intended to permit missing or modifying the duration of certain sequences as a function of the indications of vehicle detectors such as DA in FIG. 1.

For this purpose, the actualisation assembly receives over lines SA to SD binary coded information on the sequence in progress. These items of data are first decoded in the decoder 141 which is of the same type as the decoder 58 in FIG. 1, and has output lines S1/ to S16/ for the 16 sequences. The signal CM/ originating from the basic assembly is applied via an inverter 1411 to inhibit the decoder 141 in the same way as was the decoder 58. Consequently, in the condition CM/ = Zero (a position of manual control by a policeman, or inhibition INI = ONE), none of the output lines S1/ to S16/ of the decoder 141 is at level ZERO. No sequence indication is therefore available in the actualisation assembly, and this latter cannot function during inhibition or during control by a policeman.

The connections S1/ to S16/ are made to a matrix 142 of the same type as the matrix in FIG. 6. These conductors S1/ to S16/ form the columns of the matrix while the lines are constituted on the one hand by six pairs of conductors (SS1m/, SP1m/ to SS6m/, SP6m/), and another separate conductor SBLm0/ These output signals from the matrix 142, of the in circuit/out of circuit type, are passed to a circuit 143 which adapts them to the logic levels ZERO and ONE of the logic circuits of the type used. The output signals of the circuit 143 are therefore the same as the input signals but after they have been formulated. These signals bear references SS1 and SS1/, SP1 and SP1/ for the pair SS1m/, SP1m/, and so on. The signal SBLm/ is converted to a signal SBL.

In this way, four output signals from the circuit 143 are obtained and bear the same numerical reference (such as SS1, SS1/, SP1, SP1/), which are allocated to an actualisation "track". Hereinafter, a description will be given of only track 1 which corresponds to circuit 1441. The other tracks are identical with the exception of the fact that they do not receive the signal RS1. Such a track receives two so-called call signals: a signal D1/ which is at level ZERO when an actual detector is detecting the presence (or passing) of a vehicle, and a signal DM1/ which has the same characteristics but is simulated in a matrix 145. The matrix 145 comprises two columns having the level ONE (voltage +) and the level ZERO of ground respectively. The diode plugs allow simulation programming over six line conductors of this matrix 145 which respectively provides the signals DM1/ to DM6/.

Each circuit such as 1441 provides a signal such as Ap1, representative of the fact that a call originating from D1/ or DM1/ is received by the circuit, and a signal MAp1, representative of the fact that a corresponding call memory unit is in the call position.

The outputs FAcc/ of the actualisation tracks (circuits such as 1441) are all connected together and passed to an inverter 1447. The output of the inverter 1447 is passed to a NO-AND gate 1448 which provides at its output the acceleration signal Acc/ in response to the actualisation track, on condition that the actualisation blocking signal BLA/ is at the level ONE (no blocking).

Therefore, the actualisation tracks make it possible to command accelerations towards an end of sequence in response to the indications given by vehicle detectors. This acceleration is possible only on the six "main" sequences (SP1m/ to SP6m/) programmed in the matrix 142, among the 16 sequences provided by the basic assembly.

Figure 13:
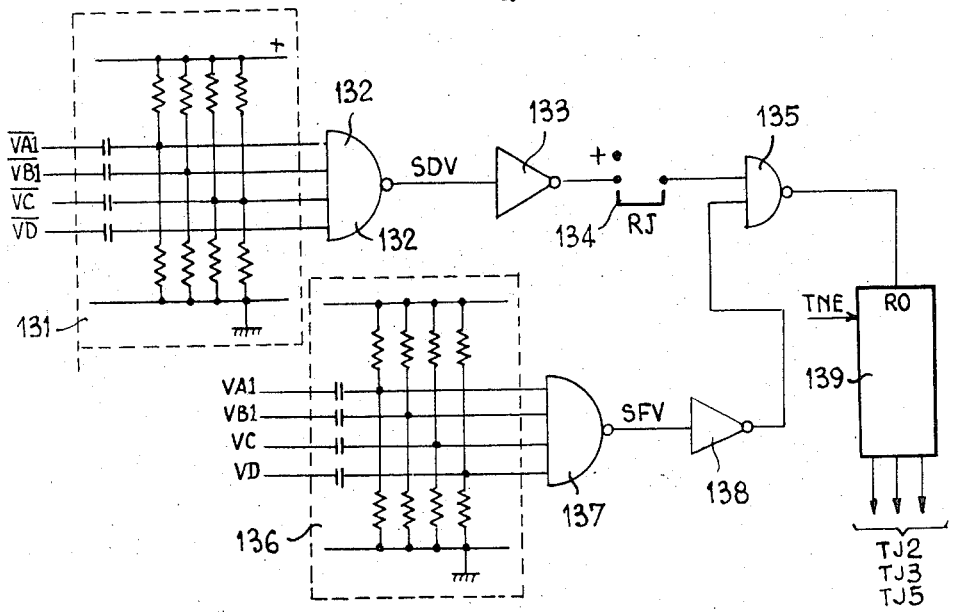
FIG. 13 is a detailed diagram of the unit 107 in FIG. 10.

The signals SP1/ to SP6/ are passed via a unit 146 which has a structure similar to that described for the elements 131 and 132 in FIG. 13. The unit 146 therefore provides at its output a signal SDSp which is at level ONE every time one of the signals SP1 to SP6 has a rising front, that is to say for each commencement of one of the signals SP1 to SP6. This signal is applied to the input Ro of a binary counter 147 in order to zero this latter. The counter 147 receives from the circuit 148 counting signals at the frequency of the time TNE according to certain conditions described hereinafter, between the calls (signals Ap) and the signals such as SP and SP/.

The counter 147 has six binary counting outputs T1 to T6. These outputs are passed to the circuit 149 which comprises a programming matrix of the maximum period allowed for each main sequence, and will be described in greater detail hereinafter. The circuit 140 also receives the aforesaid signals SP1 to SP6 from the circuit 143 and a signal SMA/ originating from a unit 150. The circuit 149 is capable of providing two output signals: the first FAcc/ controls the inverter 1447 to obtain an acceleration when the programmed duration for the main sequence in progress is achieved; the second, designated by the reference RS1, permits the main sequence SP1 of the track 1 (circuit 1441) when all the call memory units are simultaneously actuated (condition SMA/ = ZERO).

The unit 150 receives call memory signals MAp and the signals SP/ from the circuit 143. It combines them to form the signal SMA/ indicating that no call memory unit is being called upon outside of the associated main sequence. Moreover, when this signal SMA/ is present during the course of a sequence for which a signal SBLm/ is programmed in the matrix 142, the actualisation blocking signal BLA/ is then generated at level ZERO. This signal BLA/ stops the basic assembly at the end or the beginning of the sequence in progress, so long as it is at the level ZERO, according to the position of the switch BLM.

The circuit 1441 of FIG. 14 will now be described in greater detail with reference to FIG. 15. The circuit 1441 comprises a first transistor input stage 151. This transistor allows adaptation of the logics used for call control. The resistors, diodes and capacitors for adaptation purposes will not be described in greater detail. The transistor receives at its base the signals DM1/, D1/ and CM/, as well as RS1 (only in the case of 1441). A call may therefore be obtained either in response to a simulation or in response to an actual detector, or in response to the signal CM/, or by the signal RS1. At its collector, the transistor 151 provides a signal Ap1 which is at level ONE in presence of a call (blocking of the transistor 151). This signal Ap1 is transmitted to a first bistable having NO-AND gates and designated by general reference 151. The lower NO-AND gate of this bistable 152 receives the signals Ap1 and SP1/, while the upper one receives the signal SP1 and, according to the position of a switch 153, either the signal Ap1 or a level ONE. When the switch 153 is connected so that this gate receives the signal Ap1, the actualisation track functions on re-call (in the case of passing vehicle detectors, see above). The output signal from the bistable or call memory unit 152 is available on the line MAp1. This signal is at level ONE when a call has been recorded, at at level ZERO in the contrary case.

The two output connections of the bistable 152 are passed respectively via two NO-AND gates at the input of a bistable 154 in which the data from the call memory unit 152 is re-copied on condition that the signal SS1/ is at level ONE. For this purpose, the signal SS1/ is also applied to each of the input gates of the bistable 154. The output signal from this bistable, taken over the upper track to obtain an inversion, is applied to a NO-AND gate 155 which also receives the signal SS1 and at its output provides the signal FAcc/ which goes to the inverter 1447. The signal FAcc/ can be provided by each of the actualisation tracks 1441 to 1446 or by the circuit 149.

Actutalisation therefore takes place for each track from a main sequence SP (capable of containing several basic sequences) and one or more secondary sequences SS.

A call is registered in a call memory unit such as 152 if it appears outside of the main sequence such as SP1. It is normally erased during the main sequence SP1. However, for certain passing vehicle detectors, the call can be erased only if a movement is detected during the main sequence.

A registered call (MAm1) is re-copied in a re-copying memory unit (154), on condition that a secondary sequence (SS1) is not in progress.

The complemented re-copied call (output of 154) commands an acceleration (FAcc/) when a secondary sequence (SS1) is in progress (except in the case of actualisation blocking by BLA/).

In this way, a main sequence can exist only if a call has been registered and re-copied; otherwise it is skipped with its secondary sequences. When a main sequence is not skipped, it may be completed rapidly by an acceleration FAcc/ emanating from the circuit 149, by reason of a maximum period which will be defined hereinafter having been exceeded.

Figure 14:
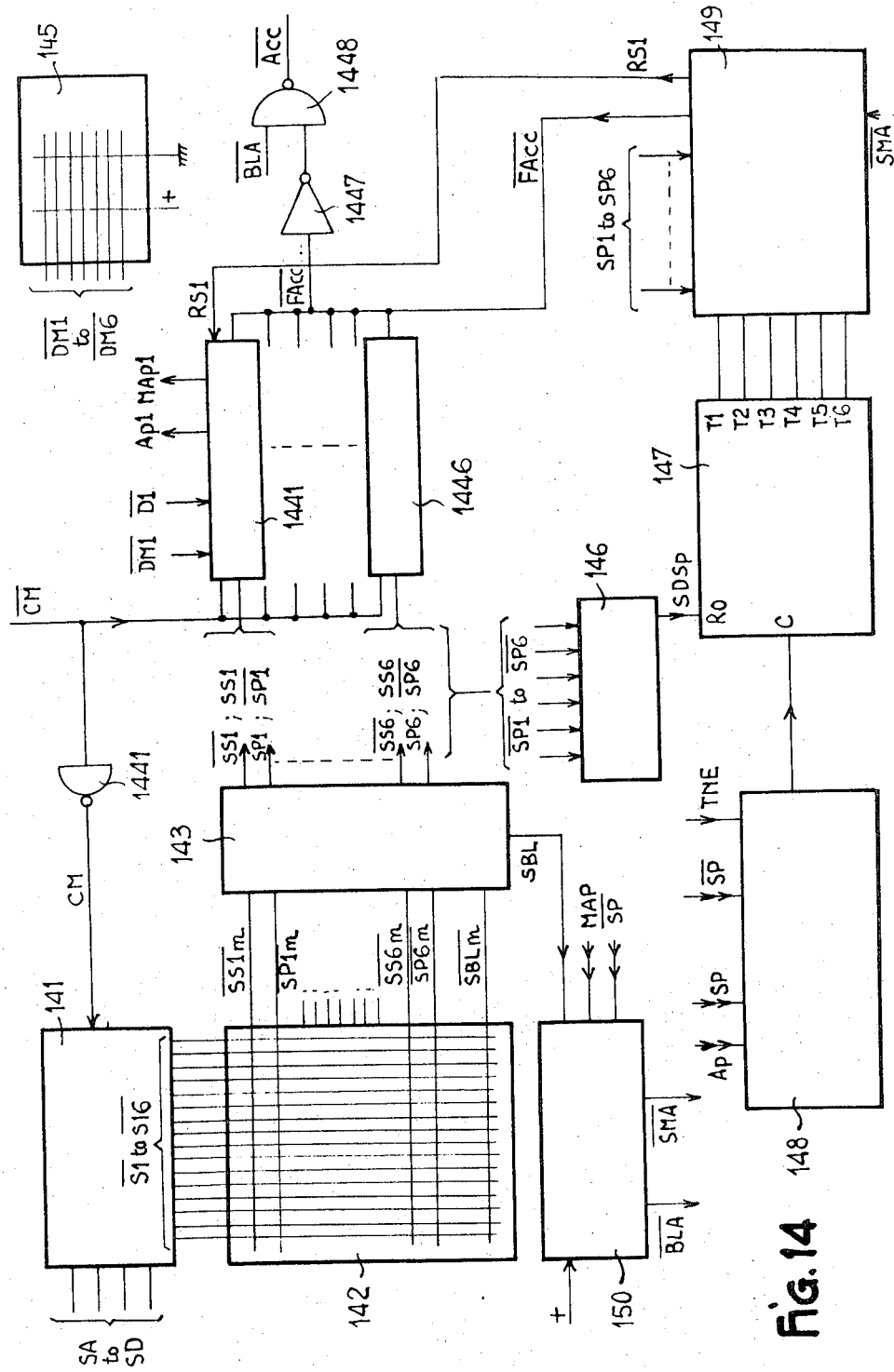
FIG. 14 is a diagram showing the principle of the actualisation assembly A of FIG. 1.

FIG. 16 shows the detailed description of the circuit 148 of FIG. 14. This circuit provides a condition for establishing the maximum time.

The gates designated by the general reference 161 provide logic functions such as $\overline{Ap1 . SP1}$. The gates designated by the general reference 162 provide logic functions such as $\overline{Ap1 . SP1}$. The outputs of the gates 161 are all connected to one another and applied via an inverter 163 to a NO-AND gate 164 to provide Ap1 . SP1. The outputs of the gates 162 can be connected to one another according to the position of switches 1621, and the common conductor thus formed is connected to the second input of the NO-AND gate 164. The output of the NO-AND gate 164 is passed to another NO-AND gate 165 which likewise receives the signal TNE after inversion and differentiation of this latter in a circuit 166. The output of the NO-AND gate 165 is passed to the counting input C of the counter 147. Therefore, the counter 147 will receive time pulses for each main sequence in progress:

when there are no further calls (Ap1 for example) on the main sequence in progress, or when there are calls on other main sequences which are not in progress, according to the position of the switches 1621.

Alternatively, and particularly when a switch BLM is provided in the basic assembly, a switch BLI is provided in the actualisation assembly (FIG. 16) to block the counter 147 under the action of the signal $\overline{SMA}$ (no call registered on the main sequences not in progress).

The counter 147 therefore measures the duration of non-usage of GREEN on the main sequence in progress, possibly taking into account calls on the other principal sequences marked by the switches 1621 save perhaps where there is no call waiting on another track, when the switch BLI is operated. It will be recalled that the counter 147 is zeroed at the start of each main sequence (circuit 146).

Figure 17:
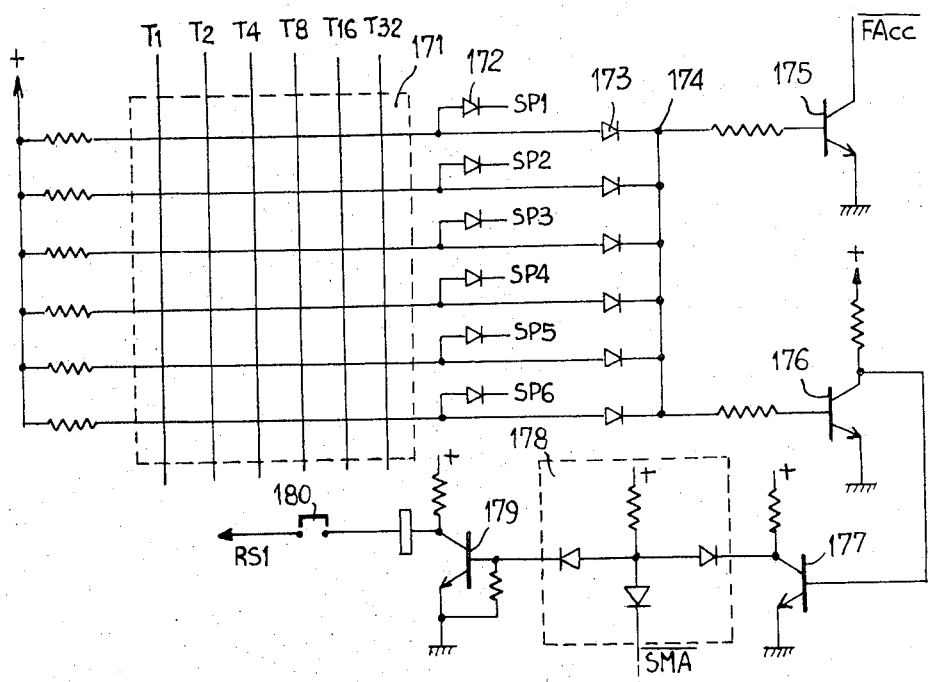
FIG. 17 is a detailed diagram of the unit 149 in FIG. 14.

The circuit 149 in FIG. 14 will now be described according to the detailed embodiment shown in FIG. 17.

The circuit 149 comprises a matrix 171 which receives in six columns the conditions of outputs T1 to T32 of the binary counter 147. The lines of the matrix 171 are connected by respective resistors to the voltage + which materialises the logic level ONE. These lines are moreover connected to the anodes of diodes such as 172, of which the respective cathodes receive the signals SP1 to SP6. Finally, each line is linked to the anode of a diode such as 173. The cathodes of the diodes 173 are all connected together. Programming is carried out as previously by insertion of diode plugs at the point of intersection of the lines and columns of the matrix 171. Since at any time only one of the signals SP1 to SP6 is at level ONE, only one line of the matrix will provide a positive condition (level ONE) when the counting programmed on this line is attained. The level ONE which is thus available at the point 174 is transmitted on the one hand to a transistor 175 which inverts it to provide on its collector the aforesaid signal FAcc/, and thereby operate an acceleration when the duration programmed for the corresponding sequence SP is attained, having regard to the aforesaid counting conditions of the counter 147.

Moreover, the same signal at the pont 147 (level ONE) is transmitted to a transistor 176 which inverts it then to a transistor 177 which restores it with its initial polarity (level ONE). When the signal of the transistor collector 177 is at level ONE, and the signal SMA/ is likewise at level ONE (no call), a diode circuit 178 then frees a transistor 179, which transmits a signal RS1 /level ZERO) to the circuit 1441 corresponding to the first actualisation track. In this way, when no call is received, and when a switch 180 is operated, the return to track 1 is commanded by means of a call via RS1.

Figure 18:
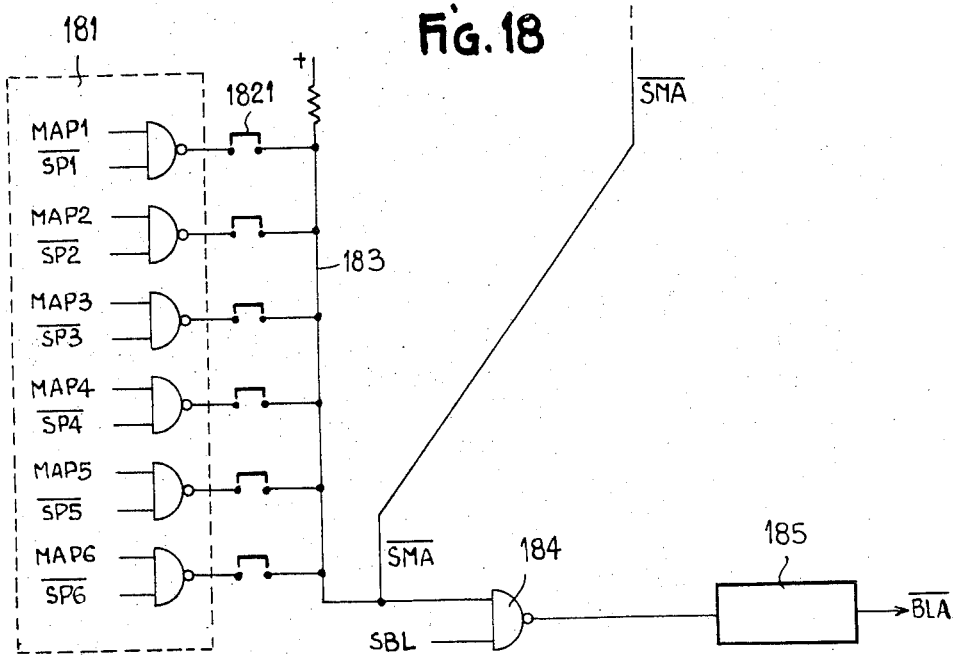
FIG. 18 is a detailed diagram of the unit 150 in FIG. 14.

The unit 150 in FIG. 14 will now be described in greater detail with reference to FIG. 18.

This circuit comprises a plurality of NO-AND gates 181 each of which receives input signals such as MAp1 and SP1/. These logic combinations are transmitted via switches 1821 to a common conductor 183 itself conducted via a resistor to the voltage + (level ONE). The conductor 183 is then at level ONE only when no call memory unit has registered a call (MAp) beyond its corresponding main sequence (SP/). This "no call" signal is designated by reference SMA/. It is passed to the circuit 178 of FIG. 17 to carry out the function which has just been described. It is likewise combined in a NO-AND gate 184 with a signal SBL provided by formulation of the programming signal available on the line SBLm/ of the matrix 142. The output combination of the gate 184 is formulated (and retarded) by a circuit 185 to provide the actualisation blocking signal BLA/ already mentioned. Actualisation blocking is therefore obtained when no call memory unit has registered a call outside of the associated main sequence. Under these conditions, if the main sequence in progress has been programmed "with blocking" on the line SBLm/, it retains the GREEN for the duration of the signal BLA/ at level ZERO.

The actualisation assembly which has just been described permits of the following functions:

on the main sequences for which there are no blocking diode plugs SBLm/, the maximum duration is defined by the programming in the basic assembly, whether the signal RS1 is used or not; there must however be at least one blocking plug in the case of non-usage of the signal RS1.

In the same case, if there is no plug SBLm/ and in the absence of a call, all the lights are at RED, because the accelerated time Acc/ is used permanently; the first call triggers the corresponding GREEN.

On the main sequences which have a blocking diode plug SBLm/, and with use of the signal RS1, if only the corresponding actualisation track is called, it is possible to exceed the maximum programmed duration in the basic assembly so long as the counter 147 has not reached the maximum programmed in the matrix 149, then returns to the main sequence SP1 occurs.

On the main sequences having a plug SBLm/, without the use of RS1, blocking is absolute, and exceeding of the programmed time is not limited.

Moreover, it is possible separately to programme in the basic assembly a minimum duration which cannot be skipped and which is just prior to a main sequence, and another which is just afterwards. In this case, the maximum GREEN time apparent for a principal sequence is broken down as follows:

initial GREEN programmed in part as a basic sequence, which cannot be skipped;

minimum GREEN which can be skipped, programmed in the counter 147;

GREEN for time when vehicles are present (having regard to calls on other tracks) supplied by the circuit 148;

blocking GREEN (possibly in the absence of calls) if there is a plug SBLm/, final programmed GREEN is applicable in part as a basic sequence, cannot be skipped.

One must bear in mind the fact that the sequences which can be skipped for a given main sequence are the associated secondary sequences.

According to the four aforesaid methods of functioning, the apparent maximum GREEN reduced by the initial and final GREENS is or is not of lesser duration than its value as programmed in the basic assembly.

The signal CM = CMA + INI inhibits the decoder 141, and its complement CM/ simulates a call in all the call memory units so that the actualisation assembly starts to function without skipping sequences.

The inputs D such as D1 to D6 may be connected not to detectors but to a central traffic control station such as a computer, in order to receive orders for acceleration towards an end of a sequence.

The local co-ordination assembly C of FIG. 1 will now be described in detail with reference to FIG. 19.

Co-ordination is carried out between a plurality of crossroads controllers, one of which is the master while the others are slaves. The slave controllers engender their cycle in a co-ordinated fashion with a programmable amount of stagger in respect of the master.

For this purpose, an omnibus line having two conductors SY1 and SY2 carries all or nothing square signals SY 12 which can be, for example, modulated to 50 Hz. The square signals are rectified and formulated in a unit 191 in order to provide a negative pulse every time the modulation is established. In the slave position (position E for a switch 192), this signal is transmitted via an inverter 193 to the input Ro for zeroing a binary counter 194 having eight counting outputs C1 to C128. The counter 194 counts at the frequency of the signal TNE which is generally a 1 Hertz signal derived from the 50 Hertz mains in the basic assembly. The output C1 to C128 of the counter 194 can be transmitted through switches 195 to provide a programming of a selected counting value. The outputs thus programmed are connected to a NO-AND gate 196 followed by an inverter 197. Preferably, several programming values are provided by a plurality of gates 196, each having a supplementary command input; in this case, the inverter 197 is also a NO-AND gate receiving the outputs from all the NO-AND gates 196. The output of the inverter 197 therefore provides a retarded pulse which is used as a reference for a characteristic moment of the cycles engendered by the local basic assembly.

The pulses available at the output of the inverter 197 are applied to the input J of a bistable 198 and to a NO-AND gate 199. The bistable 198 is triggered at the frequency of 50 Hertz by the signal bearing the reference 50Hz, and receives through its input K the output pulse from the inverter 193. The false output Q/ of the bistable 198 is also applied to the NO-AND gate 199. This bistable 198 is in the false condition between each output pulse from the inverter 193 and the retarded output pulse from the inverter 193. For a slave controller, it is the lapse of time separating the retarded synchronisation pulse from the synchronisation pulse emitted by the master circuit.

The input signal of the inverter 193 is also applied to the forcing input for establishing the false condition or zeroing RAS of a bistable 200 which, as a safety measure and through its input RAU for forcing to the true state, receives a logic combination of the outputs C32 to C128 of the counter 194. In this way, the bistable 200 is in the false state between the commencement of counting of the counter 194 and the counting value 224. When the time TNE is 1 second, this time is 224 seconds. The false output Q/ of the bistable 200 which is then normally at condition ONE is transmitted via a switch 201 to the input of an inverter 202 which at its output furnishes the signal COA/, and to a third input of the gate 199. In this way, when the switch 201 is connected to the output Q/ of the bistable 200, a signal COA/ representing co-ordinated functioning is generated and the gate 199 is operated to allow passage of the synchronisation pulse available at the output from the inverter 197. When the switch 201 is connected to ground, co-ordination is not used.

The co-ordination pulse provided by intersection of the output signal of the inverter 197 and the output signal Q/ of the bistable 198, offset by a 50Hz complementary pulse, is transmitted by the NO-AND gate 199 according to the state of a fourth input SVP of this latter. The signal SVP is either at a level ONE or is a special signal according to the position of a switch 202. The special signal SVP is generated with an offset between the characteristic moments at the various crossroads controllers to take place when co-ordination is implemented. Preferably, these characteristic moments are the ends of the first sequences supplied by the basic assemblies of the crossroads controllers which operate in co-ordinated fashion.

A master co-ordination circuit also comprises a circuit for passing over an omnibus line comprising two conductors SY1 and SY2 a signal representing the sequence S1 of its basic assembly. This signal is a synchronous loop of the sequence S1 and modulated at 50Hz in a NO-AND gate 204; it is formulated and amplified in a circuit 205 to provide the aforesaid signal SY12.

Figure 19:
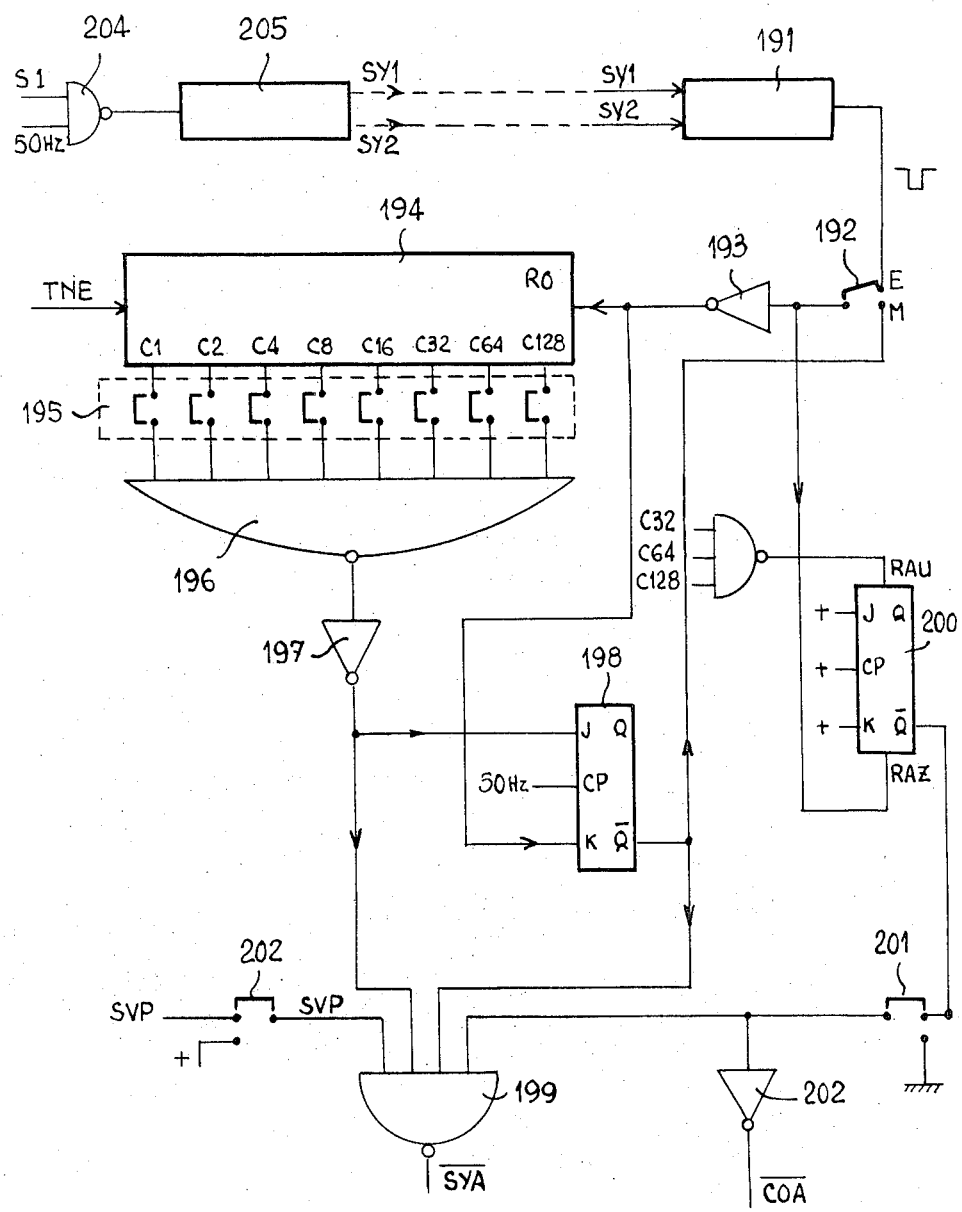
FIG. 19 is a detailed diagram of the local coordination assembly C in FIG. 1.

Preferably, the co-ordinating assembly likewise receives signals SA to SD and comprises a decoder of the previously described type, which is not shown in FIG. 19. In this case, co-ordination may be carried out on any one of the programmed sequences in each basic assembly.

The signal CORD of each basic assembly is the function AND of the signal CO and of the sequence on which co-ordination is performed.

The signal SVP makes it possible to provide a minimum duration for the co-ordinating sequence, inhibiting the NO-AND gate 199 so long as this duration has not been attained. This signal is derived from the decoded co-ordination sequence and from a time counting with programming as in the case of the circuits 147 and 149 in the actualisation assembly.

The choice of programs for staggering via the gates such as 196 can be made either by a suitable control input (day, night, for example), or by variation of the frequency carrying the signal SY12 (several frequencies which can be separated at the rate of one per program), or by omnibus links using supplementary wires.

Finally, when a minimum duration is programmed for the co-ordinating sequence and/or when the end of this sequence is commanded in the basic assembly (unit 55) by the first present of the two signals Σ1/ and SY (switch COP operated), the co-ordination takes effect with an initial offset which is progressively reduced according to the time.

The crossroads controller according to the invention therefore provides a plurality of different functioning cycles composed of basic sequences which are the indivisible elements of the programming of the condition of the traffic lights.

In addition to certain special commands such as that of inhibition; by an external signal INI, the controller permits of dimming operation, and is capable of carrying out the successions of lights according to differential standards which vary with the places of use.

The intervention of traffic policemen is possible, in the form of particularly simple commands.

A reservation function is available for pairs of lights of which one is secondary in relation to the other, this function being performed at the level of the implementing assemblies.

An actualisation assembly allows modification of the duration or the skipping of certain sequences, either according to local detections or on the basis of a central command post, for example a computer.

A local co-ordination assembly allows synchronised functioning, with adequate delays, of several controllers installed in geographically adjacent places.

It is possible to have several controllers operate in parallel to increase the number of different cycles available. In this case, the conditions of lines SA, SB, SC and SD given the coding of sequences are common to all controllers; it is likewise possible to increase the number of lines VAM/ to VDM/ of the matrix in FIG. 7.

Finally, it is possible to have a plurality of crossroads controllers functioning in parallel in order to multiply the available number of base sequences such as S1 to S16. In this case, it is sufficient by the INIext/ to inhibit all the controllers except one, and to have the absence of inhibition circulate over all the controllers.

What I claim as my invention and desire to secure by Letters Patent is:

1. In a crossroads controller for controlling the operation of a plurality of traffic signal display devices, a combination comprising:

a time base circuit for generating a first signal having a substantially constant frequency;

a first counting circuit for respectively timing the durations of a plurality of successively occurring sub-intervals that together define a basic interval that repeats in cyclical manner, the circuit having an input for receiving the first signal for stepping the counter while timing each sub-interval, a plurality of inputs for receiving at the start of each sub-interval presetting signals selectively coded to provide a starting count for the counting circuit, and an output, the circuit being operative to count from its starting count and upon reaching a predetermined count provide at the output an indication that timing of a sub-interval is complete;

a second counting circuit for counting the complete indications, the second counting circuit stepping through a plurality of counts respectively corresponding to the plurality of sub-intervals and upon reaching the count corresponding to the last occurring sub-interval in each interval restepping to the count corresponding to the first sub-interval;

a decoder connected to the second counting circuit for providing an identification of which one of the sub-intervals is in progress; and programming means including a plurality of signal coding means each associated with a different sub-interval for providing the presetting signals to the first counting circuit for the associated sub-interval and further including a plurality of signal forming means for forming in parallel a plurality of binary valued command signals each for exercising control over the operation of a different one of the display devices, each signal forming means being responsive to a serial identification of successive sub-intervals by the decoder for serially programming the binary value of the command signal it forms.

2. A combination according to claim 1, in which said programming means comprises a tabled matrix having column conductors connected to the decoder, a first plurality of line conductors, a plurality of formulating circuits connected to respective line conductors, the formulating circuits being connected to said presetting inputs of said first counting circuit, and a second plurality of line conductors for furnishing said command signals relative to a characteristic state of the traffic lights, programming being made by insertion of diode plugs at the intersections of line conductors and columns selected.

3. A combination according to claim 2, further comprising a manually operable control circuit, and a circuit for controlling the commencement of the sub-intervals and being interposed between said first counting circuit and said second counting circuit and adapted to receive a sub-interval commencement signal originating from said manually operable control circuit; and said tabled matrix also comprising an additional line for programming the possibilities of intervention by said manually operable control circuit, said additional line being connected to said manually operable control circuit to condition the functioning of the latter.

4. A combination according to claim 1 in which said time base circuit includes means for generating a second signal having a substantially constant frequency, the frequency of which is higher than the frequency of the first signal, and said first-mentioned input of said first counter receives said first signal or said second signal so long as it has not reached said predetermined counting value.

5. A crossroads controller for controlling the operation of a plurality of sets of traffic lights, the controller comprising a basic assembly, and implementing assemblies for each of said sets; said basic assembly comprising a first counting circuit for counting a plurality of successively occuring sub-intervals that together define a basic interval that repeats in cyclical manner, a circuit for respectively timing the duration of each sub-interval in relation to the counting of said sub-intervals by said first counting circuit, a decoder of said counting of said sub-intervals by said first counting circuit, and a programming circuit connected to the said decoder and, according to its program providing command signals of a characteristic traffic lights condition; and said controller also comprising an inhibiting circuit responding to an external inhibition signal for zeroing said first counter and inhibiting said decoder so that said programming circuit does not provide a command signal.

6. A crossroads controller system comprising a plurality of sets of traffic lights each traffic light including a plurality of lamps, an electric power supply, a basic assembly in which a plurality of condition cycles for said lights are commanded from a basic program, and implementing assemblies adapted to execute, at each set of lights, said cycles commanded by said basic assembly; each said implementing assembly comprising a respective triac for supplying controlled current from said power supply to at least one lamp of each said set, said lamp being in series circuit relationship with said triac, said triac having the characteristic that it is energizable only if the resistance in series with it is below a predetermined maximum value, and a relay disposed in parallel with said lamp the relay having a higher resistance than the predetermined maximum and the parallel resistance presented by the relay and an operative lamp being less than the predetermined maximum whereby said relay is energized when said lamp is traversed by said current, and de-energized when said light is not being traversed by said current.

7. A crossroads controller according to claim 6 in which each relay is disposed in parallel with a red lamp, and each of said relays comprises a movable contact providing an electrical signal at a first level of voltage or at a second level of voltage according to whether said relay is energised or not.

8. A crossroads controller according to claim 7 which also comprises a safety programming matrix for opposing roads, said matrix having as conductors lines and columns of connections linked respectively with said movable contacts of said relays, the line or column conductors being connected to the associated connections through the medium of respective diodes and to a common point through the medium of other respective diodes conductive in the same direction, programming being achieved by insertion of diode plugs at selected points of intersection between said lines and columns whereby a safety signal is obtainable without active constituents in the matrix.

9. A crossroads controller according to claim 7 in which each relay comprises another moving contact connected so as to prevent illumination of the green light when said relay is energised.

10. A crossroads controller comprising a plurality of sets of traffic lights, a basic assembly in which a plurality of condition cycles for said lights are commanded by a basic program, each condition cycle being defined over an interval of time during which interval there are a succession of sub-intervals, and implementing assemblies adapted to execute, at each set of traffic lights, said cycles commanded by said basic assembly; said controller including means for modifying the duration of sub-intervals of predetermined ones of said cycles in response to signals provided by vehicle detectors, said means comprising a call memory unit for each of said vehicle detection signals, said call memory unit having a first condition in which it is placed when it receives a vehicle detection signal at a time within one of the sub-intervals other than said predetermined sub-intervals of modifiable duration, and a second condition in which it is placed when it receives a vehicle detection signal during a time within any of said predetermined sub-intervals of modifiable duration.

11. A crossroads controller comprising a plurality of sets of traffic lights, a basic assembly in which a plurality of condition cycles for said traffic lights are commanded from a basic program, each condition cycle being defined over an interval of time during which time there are a succession of sub-intervals, implementing assemblies adapted to execute, at each set of traffic lights, said cycles commanded by said basic assembly; an actualizing assembly adapted to provide an acceleration signal to the basic assembly, the duration of the sub-intervals being either normal or accelerated toward their end according to whether or not an acceleration signal is being provided to said basic assembly, said actualization assembly comprising means for extending the duration of main sub-intervals in progress in response to call signals originating from vehicles detectors showing passage of vehicles on the corresponding traffic path, when there are not at the same time passage call signals on other traffic paths corresponding to said main sub-intervals.

12. A crossroads controller according to claim 11 which also comprises call memory units adapted to register call signals originating from vehicle detectors associated with traffic paths corresponding to main sub-intervals when these sub-intervals are not in progress, and blocking means for extending a main sub-intervals in progress so long as no call has been registered in the call memory units associated with main sub-intervals which are not in progress.

13. A crossroads controller according to claim 12 which also comprises means for introducing a call into said call memory unit of a selected main sub-interval when no call has been otherwise registered, and when said main sequence in progress has reached its maximum duration of extension.

14. A crossroads controller comprising a plurality of sets of traffic lights, and a basic assembly in which a plurality of condition cycles for said traffic lights are commanded in the form of elementary sub-intervals from a basic program, said basic assembly comprising means for coordinating a time point in one of said sub-intervals in relation to a synchronizing signal with a predetermined time shift, and means for modifying the magnitude of this time shift when implementing coordination, such that the duration of said coordinating sub-interval lies betweem a minimum and a maximum to allow progressive establishment of the coordination.

15. A crossroads controller comprising a plurality of sets of traffic lights, a basic assembly in which a plurality of condition cycles for said lights are commanded from a basic program, and implementing assemblies adapted to execute, at each set of traffic lights, one of said cycles commanded by said basic assembly; said basic assembly comprising:

a time base circuit for generating normal time signals;

a circuit for counting duration of each of a plurality of successively occurring sub-intervals that together define a basic interval that repeats in cyclical manner the circuit having an input conditionally receiving said normal time signals, a plurality of inputs for presetting said duration counting circuit to starting counting values and an output providing a signal when maximum counting is reached, said signal discontinuing the arrival of said normal time signals at said input;

a circuit for counting the number of said sub-intervals, connected to the outputs of said duration counting circuit, for counting a predetermined number of duration counting circuit operations;

a decoder connected to said number counting circuit and having an output among several activated to identify a sub-interval among those which correspond to different counting values of said number counting circuit;

and a programming circuit connected to said outputs from said decoder and providing, in response thereto, on the one hand presetting signals at said presetting inputs of said duration counting circuit and on the other hand a plurality of corresponding command signals relative to a characteristic state conditions of said lights, whereby a plurality of light condition sub-intervals forming periodic cycles are furnished to said implementing assemblies.

* * * * *

UNITED STATES PATENT OFFICE
CERTIFICATE OF CORRECTION

PO-1050 (5/69)

Patent No. 3,815,085      Dated June 4, 1974

Inventor(s) Ignace Leclercq

It is certified that error appears in the above-identified patent and that said Letters Patent are hereby corrected as shown below:

Col. 1, line 12    change "pluraltiy" to -- plurality --
Col. 10, line 10    After "RA001" insert -- / --
Col. 10, line 51 et seq    The equation should read as follows:

$$\frac{[\Sigma 1 \cdot \overline{(BLA)} \cdot \overline{(CORD \cdot \overline{SM}]} \cdot [SY \cdot \overline{(BLA)} \cdot (CORD) \cdot \overline{SM}]}{\overline{(SM \cdot PM} \cdot [\Sigma 1 \cdot \overline{BLA} \cdot \overline{SM} \cdot COP]}$$

Col 11, line 35    after "prolonged" insert -- in relation to calls on other roads, which is advantageous --
Col 13, line 32    delete "consequence" and insert -- sequence --
Col 14, line 7,    after "SR" insert a slash -- / --
Col 14, line 32,    after "or" delete "gain" and insert -- again --
Col 14, line 34,    after "voltage" delete "preset" and insert -- present --
Col 18, line 46,    "GREEn" should read -- GREEN --
Col 18, line 65,    "vAl" should read -- VAl --
Col 19, line 30,    after "which" delete "alo" and insert -- also --
Col 19, line 47,    after "and" change "103" to -- 104 --
Col 19, lines 60, 61, change "invention" to -- inversion --
Col 21, line 25,    change "RNE" to -- TNE --
Col 22, line 8,    "SBLm0/" should read -- SBLm/. --
Col 23, line 6,    "140" should read -- 149 --.
Col 23, line 44,    "151." should read -- 152. --
Col 24, line 1,    "Actutalisation" should read -- Actualisation --
Col 24, line 26,    "description" should read -- diagram --
Col 25, line 24,    change "pont 147" to -- point 174 --
Col 26, line 32,    after "GREEN" change "is" to -- if --
Col 28, line 68,    after "the" insert -- signal --
Col 32, line 38,    "outputs" should read -- output --
Col 32, line 52    "conditions" should read -- condition --.

Signed and sealed this 29th day of October 1974.

(SEAL)
Attest:

McCOY M. GIBSON JR.      C. MARSHALL DANN
Attesting Officer      Commissioner of Patents